United States Patent
Munemura et al.

(10) Patent No.: US 12,236,916 B2
(45) Date of Patent: Feb. 25, 2025

(54) DRIVE CIRCUIT AND DISPLAY DEVICE FOR WRITING OF SIGNAL LINES

(71) Applicant: SONY SEMICONDUCTOR SOLUTIONS CORPORATION, Kanagawa (JP)

(72) Inventors: Naoto Munemura, Kanagawa (JP); Michiru Senda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/258,044

(22) PCT Filed: Dec. 15, 2021

(86) PCT No.: PCT/JP2021/046250
§ 371 (c)(1),
(2) Date: Jun. 16, 2023

(87) PCT Pub. No.: WO2022/138372
PCT Pub. Date: Jun. 30, 2022

(65) Prior Publication Data
US 2024/0038194 A1 Feb. 1, 2024

(30) Foreign Application Priority Data
Dec. 24, 2020 (JP) .................. 2020-215586

(51) Int. Cl.
*G09G 3/36* (2006.01)
*G02F 1/133* (2006.01)
*G02F 1/1362* (2006.01)

(52) U.S. Cl.
CPC ....... *G09G 3/3685* (2013.01); *G02F 1/13306* (2013.01); *G02F 1/136277* (2013.01); *G09G 2310/08* (2013.01); *G09G 2330/028* (2013.01)

(58) Field of Classification Search
CPC .............. G09G 3/3685; G09G 2310/08; G02F 1/13306; G02F 1/136277
See application file for complete search history.

(56) References Cited

U.S. PATENT DOCUMENTS

2002/0000985 A1* 1/2002 Hashimoto .......... G09G 3/3688
345/212
2006/0238473 A1* 10/2006 Hashimoto .......... G09G 3/3688
345/89

(Continued)

FOREIGN PATENT DOCUMENTS

| JP | 2006-301563 A | 11/2006 |
|----|---------------|---------|
| JP | 2019-053239 A | 4/2019 |

(Continued)

OTHER PUBLICATIONS

International Search Report and Written Opinion of PCT Application No. PCT/JP2021/046250, issued on Mar. 8, 2022, 09 pages of ISRWO.

Primary Examiner — Sanghyuk Park
(74) Attorney, Agent, or Firm — CHIP LAW GROUP

(57) ABSTRACT

Provided is a drive circuit that includes a gradation voltage generation unit that generates a plurality of gradation voltages that can be supplied to a signal line. The drive circuit further includes a voltage selector that selects, from among the plurality of gradation voltages, whether to supply a gradation voltage of the same voltage level as an assumed gradation voltage to a signal line or to supply a gradation voltage close to the assumed gradation voltage to a signal line.

19 Claims, 17 Drawing Sheets

(56) References Cited

U.S. PATENT DOCUMENTS

| | | | |
|---|---|---|---|
| 2008/0170027 A1 | 7/2008 | Kyeong et al. | |
| 2009/0096817 A1* | 4/2009 | Nishimura | G09G 3/3696 |
| | | | 345/690 |
| 2009/0096818 A1* | 4/2009 | Nishimura | G09G 3/3291 |
| | | | 345/690 |

FOREIGN PATENT DOCUMENTS

| | | |
|---|---|---|
| JP | 2019-070797 A | 5/2019 |
| WO | 2018/061917 A1 | 4/2018 |

* cited by examiner

DRIVE CIRCUIT AND DISPLAY DEVICE FOR WRITING OF SIGNAL LINES

CROSS REFERENCE TO RELATED APPLICATIONS

This application is a U.S. National Phase of International Patent Application No. PCT/JP2021/046250 filed on Dec. 15, 2021, which claims priority benefit of Japanese Patent Application No. JP 2020-215586 filed in the Japan Patent Office on Dec. 24, 2020. Each of the above-referenced applications is hereby incorporated herein by reference in its entirety.

TECHNICAL FIELD

The present invention relates to a drive circuit and a display device.

BACKGROUND ART

A projection type display device using a liquid crystal on silicon (LCOS (registered trademark)) technology has been proposed (see Patent Document 1). As the display device of the LCOS technology, there is a single-chip type display device using one LCOS in addition to a three-chip type display device using three LCOSs. The single-chip type display device has an advantage that the configuration can be simplified as compared with the three-chip type display device. In the single-chip type display device, a driving system called color sequential driving may be adopted, in which images of a plurality of colors are sequentially displayed in a time-division manner.

In color sequential driving, one frame is divided into a plurality of subframes for each color and driven. Furthermore, in a case where a display device of high resolution such as 4K or 8K is driven, there is a case where one color is divided into a plurality of low-resolution subframes and the subframes are sequentially displayed, thereby performing high-resolution display. Therefore, in order to perform high-resolution display on a single-chip type display device using LCOS, it is necessary to increase the number of subframes and drive each subframe at high speed.

CITATION LIST

Patent Document

Patent Document 1: Japanese Patent Application Laid-Open No. 2019-53239

SUMMARY OF THE INVENTION

Problems to be Solved by the Invention

However, high-speed driving of the subframes in the single-chip type display device causes insufficient writing of signal lines in each subframe, and the image quality deteriorates.

Accordingly, the present disclosure provides a drive circuit and a display device that do not cause insufficient writing of signal lines.

Solutions to Problems

In order to solve the above problem, according to the present disclosure, there is provided a drive circuit including:

a gradation voltage generation unit that generates a plurality of gradation voltages that can be supplied to a signal line; and a voltage selector that selects, from among the plurality of gradation voltages, whether to supply a gradation voltage of the same voltage level as an assumed gradation voltage to a signal line or to supply a gradation voltage close to the assumed gradation voltage to a signal line.

A plurality of the signal lines is arranged separately in a first direction, and the voltage selector may supply the gradation voltage equal to the assumed gradation voltage to one of two signal lines arranged in a first direction, and supply the gradation voltage different from the assumed gradation voltage to the other.

The voltage selector may supply, to a signal line to which a gradation voltage of the same voltage level as the assumed gradation voltage is supplied in one of two consecutive frame periods, a gradation voltage close to the assumed gradation voltage in the other frame period.

The voltage selector may select, from among the plurality of gradation voltages, whether to supply a gradation voltage of the same voltage level as an assumed gradation voltage to a signal line or to supply two or more gradation voltages close to the assumed gradation voltage to a signal line by switching the voltages Two or more gradation voltages close to the assumed gradation voltage may include a gradation voltage having a voltage level higher than the assumed gradation voltage and a gradation voltage having a voltage level lower than the assumed gradation voltage.

The voltage selector may select whether to continuously supply the gradation voltage of the same level to a signal line in one horizontal line period or to supply the two or more gradation voltages to a signal line by switching the voltages in the one horizontal line period.

A voltage combiner that generates a voltage obtained by combining the two or more gradation voltages supplied by switching the voltages in one horizontal line period, and supplies the voltage to the corresponding signal line may be further included.

The voltage combiner includes an amplifier that is connected to the signal line and amplifies a voltage of the signal line, and a first capacitor connected in parallel between an input node of the amplifier and an output node of the voltage selector, and a first switcher that switches whether or not both ends of the first capacitor are short-circuited, and the voltage selector may select, in one horizontal line period, a first gradation voltage in a state where both ends of the first capacitor are short-circuited by the first switcher, and then select a second gradation voltage in a state where short-circuiting of both ends of the first capacitor is released by the first switcher.

A second capacitor connected between an input node of the amplifier and a reference voltage node may be further included.

A plurality of the voltage selectors is provided for each signal line, and a voltage switcher may be further included that supplies a plurality of the gradation voltages selected by the plurality of voltage selectors to the signal line by switching the gradation voltages.

The voltage switcher may supply, to a corresponding signal line, a gradation voltage selected by the voltage selectors different from each other in one and the other of two consecutive frame periods.

The gradation voltage generation unit includes a ladder resistor including a plurality of output nodes that outputs the plurality of gradation voltages obtained by resistance-dividing two or more reference voltages, and the voltage selector includes a plurality of second switchers that switches whether the plurality of output nodes of the ladder resistor and the signal line are connected or disconnected on the basis of a gradation signal.

In another aspect of the present disclosure, there is provided a display device including:

a pixel that includes a luminance modulation element that is modulated with luminance according to a voltage of a signal line;

a signal line that supplies a gradation voltage to the pixel; and a drive circuit that generates the gradation voltage, in which the drive circuit includes a gradation voltage generation unit that generates a plurality of gradation voltages that can be supplied to the signal line, and a voltage selector that selects, from among the plurality of gradation voltages, whether to supply a gradation voltage of the same voltage level as an assumed gradation voltage to the signal line or to supply a gradation voltage close to the assumed gradation voltage to the signal line.

A pixel array unit is further included that includes a plurality of the pixels arranged in a first direction and a second direction, a plurality of the signal lines is arranged separately in the first direction, and the voltage selector supplies the gradation voltages different from each other to two of the signal lines adjacent in the first direction.

The voltage selector may supply the gradation voltage equal to the assumed gradation voltage to one of two signal lines adjacent in a first direction, and supply the gradation voltage different from the assumed gradation voltage to the other.

The voltage selector may supply, to the other of the two signal lines, two or more of the gradation voltages different from the assumed gradation voltage by switching the voltages in one horizontal line period.

The pixel array unit may include a voltage combiner that generates a voltage obtained by combining the two or more gradation voltages supplied by switching the voltages in one horizontal line period, and supplies the voltage to the corresponding signal line.

The voltage combiner may be provided in the pixel.

The voltage combiner includes a third switcher and a fourth switcher connected in series between the signal line and the luminance modulation element, a third capacitor connected between the signal line and a connection node of the third switcher and the fourth switcher, and a fourth capacitor of which one end is connected between the fourth switcher and the luminance modulation element and the other end is connected to a reference voltage node.

The voltage combiner further includes a fifth switcher and a sixth switcher connected in series between the signal line and the luminance modulation element, a seventh switcher connected between the signal line and a connection node of the fifth switcher and the sixth switcher, a fifth capacitor connected between the connection node and a reference voltage node, and a sixth capacitor connected between the connection node and the reference voltage node.

MODE FOR CARRYING OUT THE INVENTION

Hereinafter, embodiments of a drive circuit and a display device will be described with reference to the drawings. Although main components of the drive circuit and the display device will be mainly described below, the drive circuit and the display device may have components or functions that are not illustrated or described. The following description does not exclude components and functions that are not illustrated or described.

Figure 1:
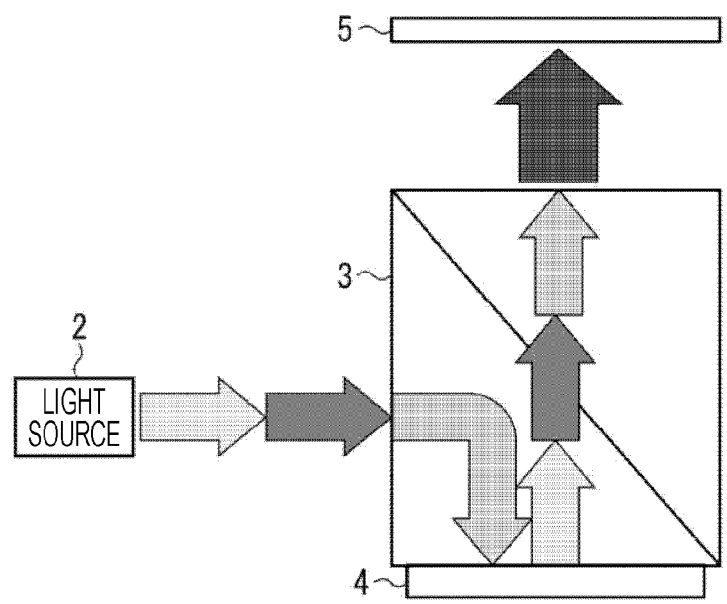
FIG. 1 is a diagram for explaining a principle of a single-chip type display device.

FIG. 1 is a diagram for explaining a principle of a single-chip type display device 1. The display device 1 of FIG. 1 includes a light source 2, an optical system 3, and a light modulation element 4.

The light source 2 sequentially emits lights of respective color components of RGB in a time-division manner. The lights emitted from the light source 2 are incident on the light modulation element 4 through the optical system 3. For example, the light modulation element 4 includes an LCOS chip. The light modulation element 4 drives a liquid crystal element in synchronization with the colors of the lights emitted from the light source 2. As a result, the display device 1 of FIG. 1 projects image lights of respective color components of RGB in a time-division manner. The projected image lights are synthesized on a screen to generate a color image. The light modulation element 4 controls the amount of rotation of liquid crystal according to the voltage of a signal line to control the amount of reflection and the amount of transmission with respect to the incident light. Alternatively, the light modulation element 4 performs luminance modulation according to the voltage of a signal line. In the present specification, the light modulation element 4 may be referred to as a luminance modulation element.

Figure 2:
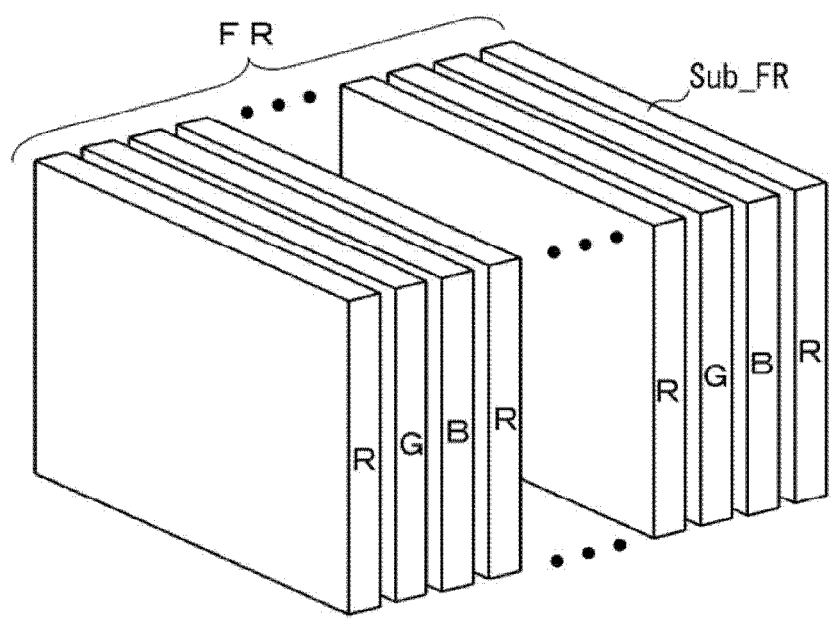
FIG. 2 is a diagram schematically illustrating a plurality of subframes in one frame.

FIG. 2 is a diagram schematically illustrating a plurality of subframes Sub_FR in one frame FR. Image lights of the subframes Sub_FR of FIG. 2 are sequentially projected from the display device 1 and synthesized on a screen 5 to obtain one frame image (color image). The subframes Sub_FR are projected on the screen 5 at different timings, but since there is an afterimage in human eyes, a color image obtained by synthesizing the plurality of subframes Sub_FR is visually recognized. Although FIG. 2 illustrates an example in which subframes of RGB are sequentially displayed, subframes of colors other than RGB (for example, white) may be provided.

Figure 3:
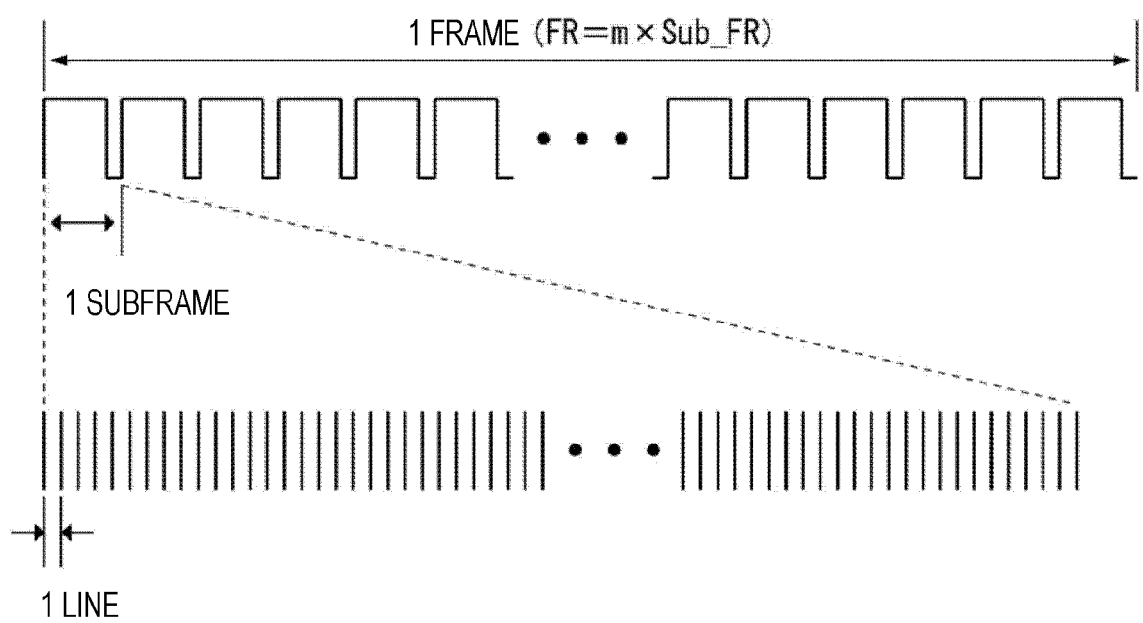
FIG. 3 is a waveform diagram illustrating the timing of a frame and a subframe.

FIG. 3 is a waveform diagram illustrating the timing of the frame FR and the subframe Sub_FR. Each frame FR includes m (m is an integer of 2 or more) subframes Sub_FR. In one subframe Sub_FR period, n lines (n is an integer of 2 or more) are driven, and p (p is an integer of 2 or more) signal lines are driven in each line. Furthermore, m subframes Sub_FR are driven in one frame period.

Figure 4:
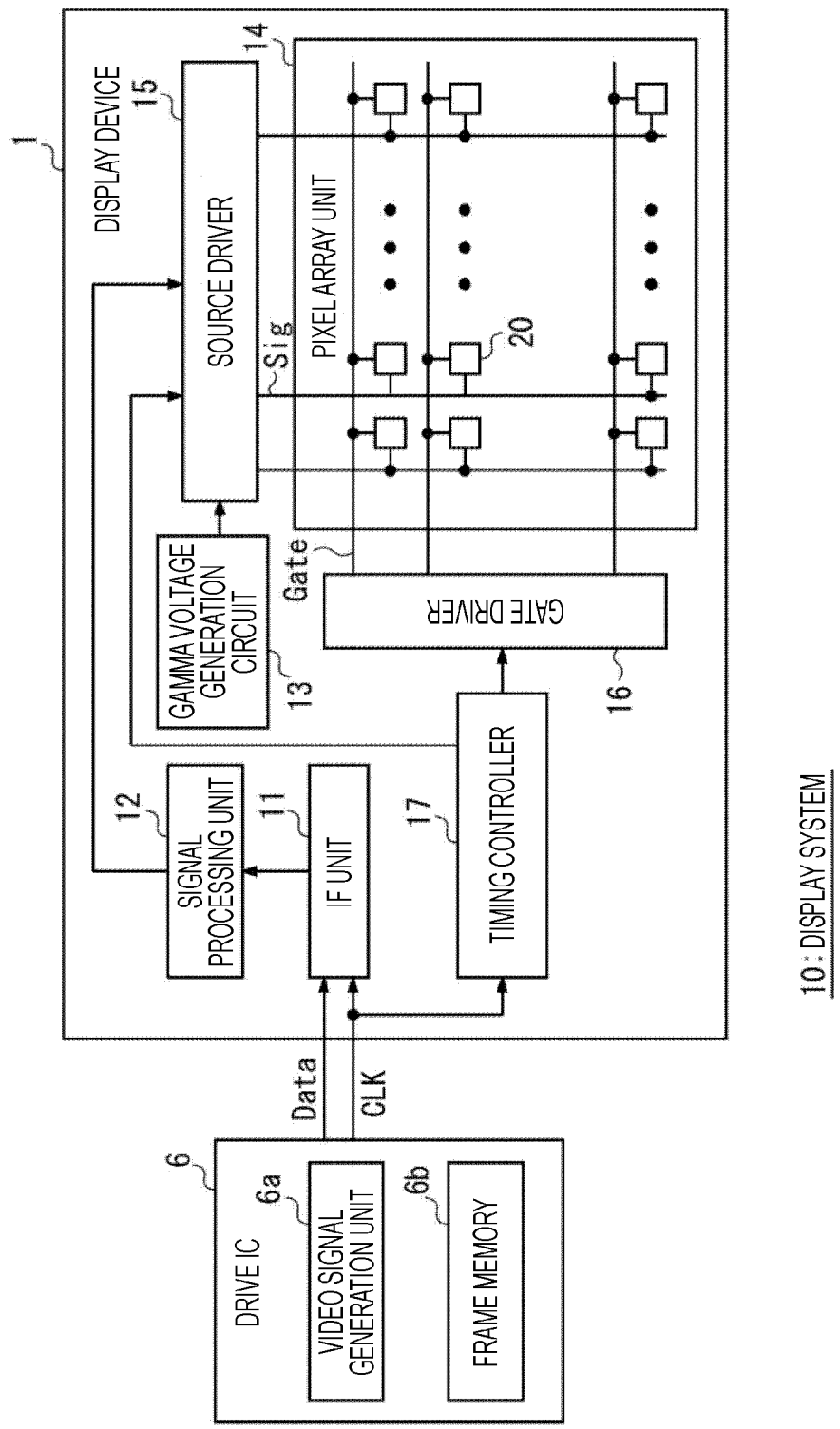
FIG. 4 is a block diagram of a display system including a display device and a drive IC according to an embodiment.

FIG. 4 is a block diagram of a display system 10 including the display device 1 and a drive IC 6 according to an embodiment. For example, the display device 1 is formed on an insulating substrate such as a glass substrate. The drive IC 6 may be mounted on the same insulating substrate as the display device 1, or may be mounted on a substrate different from the display device 1 to transmit and receive various signals to and from the display device 1 by a flexible printed circuit board (FPC) or the like. The drive IC 6 includes a video signal generation unit 6a and a frame memory 6b. The video signal generation unit 6a generates a digital video signal. For example, the frame memory 6b includes the frame memory 6b that stores a video signal for one frame FR. The drive IC 6 supplies the video signal and a control signal to the display device 1. The control signal includes a clock signal, and the display device 1 controls the display timing on the basis of the clock signal.

The display device 1 includes an IF unit 11, a signal processing unit 12, a gamma voltage generation circuit 13, a pixel array unit 14, a source driver 15, a gate driver 16, and a timing controller 17.

The video signal output from the drive IC 6 is input to the signal processing unit 12 via the IF unit 11. The signal processing unit 12 determines a gradation voltage on the basis of the video signal. More specifically, the signal processing unit 12 generates a gradation signal including a plurality of bits corresponding to a gradation voltage.

Figure 6A:
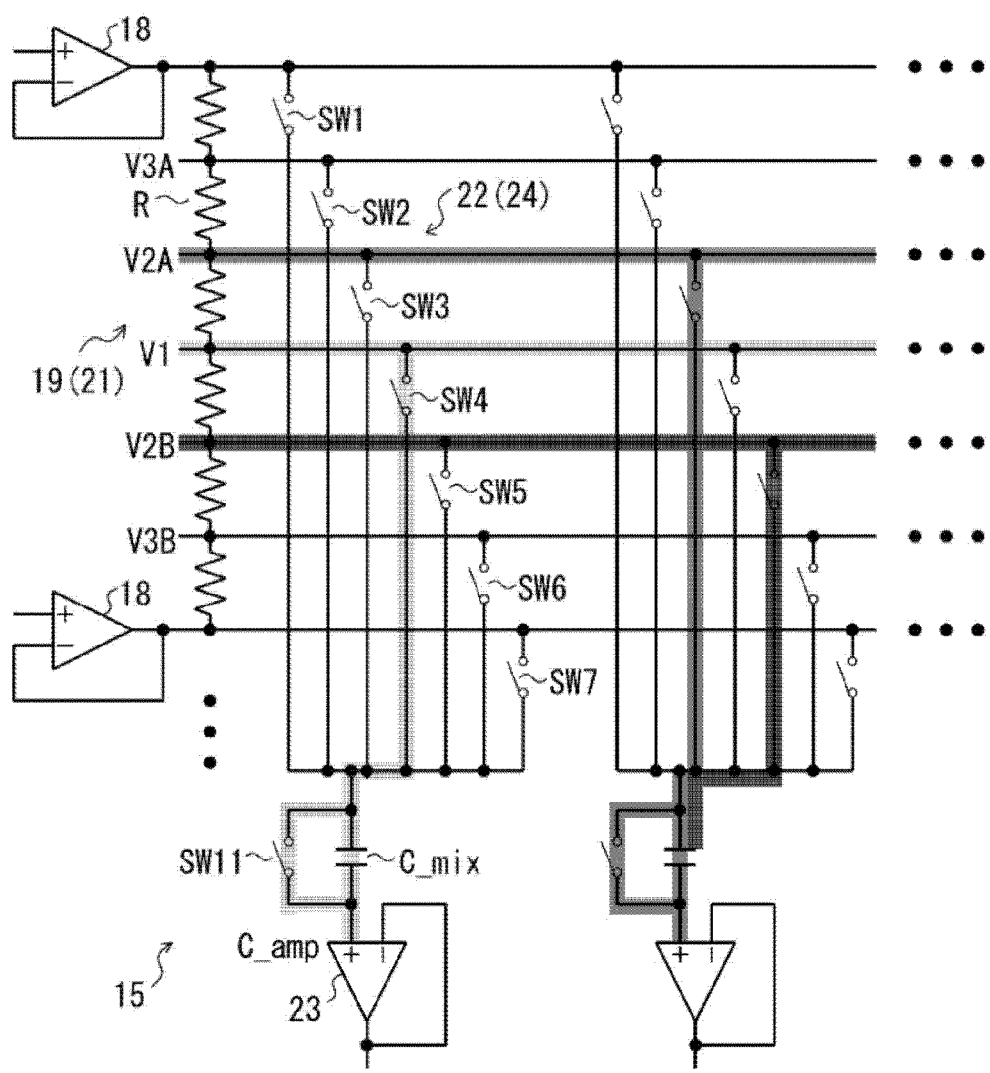
FIG. 6A is a block diagram illustrating an internal configuration of a source driver according to a first embodiment.

The gamma voltage generation circuit 13 includes an amplifier 18 and a ladder resistor 19 as illustrated in FIG. 6A to be described later. The amplifier 18 generates a reference voltage to be supplied to the ladder resistor 19. The ladder resistor 19 includes a plurality of resistors R connected in series between two reference voltage nodes. The ladder resistor 19 outputs a plurality of gamma voltages from between the plurality of resistors R. The plurality of gamma voltages is voltages written in each signal line. The plurality of gamma voltages is input to the source driver 15.

The pixel array unit 14 includes a plurality of pixels 20 arranged in a matrix in the horizontal direction and the vertical direction, a plurality of signal lines Sig each extending in the vertical direction and arranged separately in the horizontal direction, and a plurality of gate lines Gate each extending in the horizontal direction and arranged separately in the vertical direction.

The source driver 15 drives the plurality of signal lines Sig. Furthermore, the source driver 15 selects one of the plurality of gamma voltages generated by the gamma voltage generation circuit 13 on the basis of the gradation signal indicating a gradation voltage output from signal processing unit 12. The source driver 15 includes a decoder for each signal line. Each decoder turns on one of a plurality of switches on the basis of the gradation signal including a plurality of bits from the signal processing unit 12. The plurality of switches is provided corresponding to the plurality of gamma voltages, and if any one of the switches is turned on, the gamma voltage connected to the turned-on switch is supplied to the corresponding signal line. In the present specification, as described later, a decoder may be referred to as a voltage selector.

The gate driver 16 sequentially drives the plurality of gate lines Gate on the basis of the control signal output from the drive IC 6. As a result, display driving is performed for each horizontal line.

The timing controller 17 generates a clock signal for causing the source driver 15 and the gate driver 16 to operate in synchronization on the basis of the clock signal from the drive IC 6.

Figure 5:
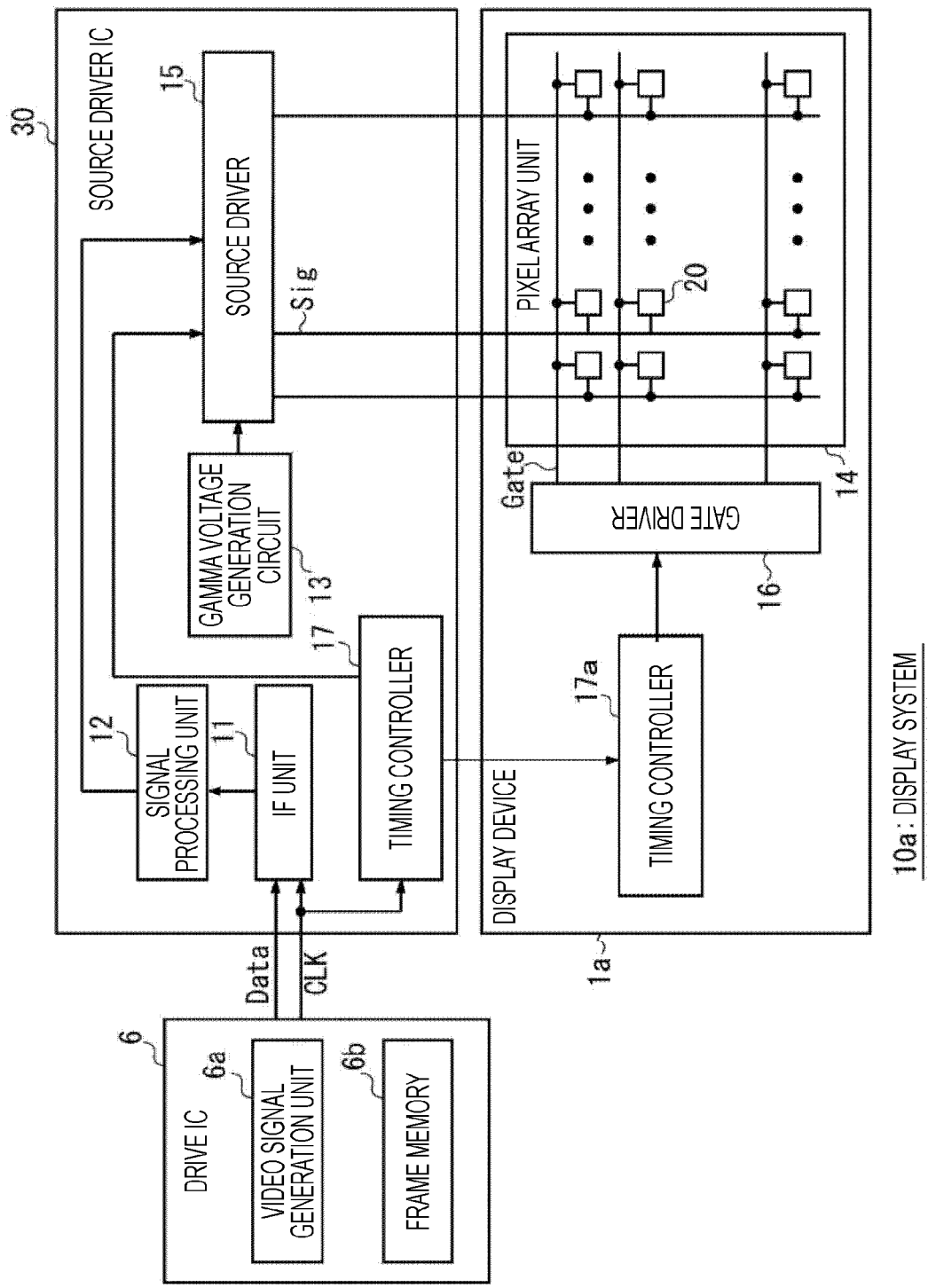
FIG. 5 is a block diagram of a display system including a drive IC, a source driver IC, and a display device according to a modification.

The internal configuration of the display device 1 of FIG. 4 can be changed at least partially. FIG. 5 is a block diagram of a display system 10a including the drive IC 6, a source driver IC 30, and a display device 1a according to a modification. The display device 1a of FIG. 5 converts the source driver 15 into an IC to be provided outside the display device 1.

The display system 10a of FIG. 5 includes the display device 1a, the drive IC 6, and the source driver IC 30. The internal configuration of the drive IC 6 is the same as that in FIG. 4. Note that the signal lines in the pixel array unit 14 may be driven by a plurality of source driver ICs 30.

The display device 1a of FIG. 5 includes the pixel array unit 14, the gate driver 16, and a timing controller 17a. The source driver IC 30 includes the IF unit 11, the signal processing unit 12, the gamma voltage generation circuit 13, the source driver 15, and the timing controller 17. The clock signal output from the drive IC 6 is input to the timing controller 17 in the source driver IC 30 via the IF unit 11. The timing controller 17 supplies the clock signal to the timing controller 17a in the display device 1. As a result, the drive IC 6, the source driver IC 30, and the display device 1 operate in synchronization with a common clock signal.

The display device 1 according to the present embodiment is characterized in the internal configuration of the source driver 15. The source driver 15 according to the present embodiment has a function of performing high-speed driving of signal lines without causing insufficient writing of the signal lines.

First Embodiment

FIG. 6A is a block diagram illustrating the internal configuration of the source driver 15 according to the first embodiment. The source driver 15 of FIG. 6A includes a gradation voltage generation unit 21 and a voltage selector 22.

The gradation voltage generation unit 21 generates a plurality of gradation voltages that can be supplied to signal lines. The gradation voltage generation unit 21 corresponds to the gamma voltage generation circuit 13 of FIG. 4, and is configured by using a plurality of amplifiers 18 that outputs different reference voltages and the ladder resistor 19 that is connected between output nodes of two amplifiers 18 adjacent in the vertical direction.

In the example of FIG. 6A, the ladder resistor 19 is configured by connecting six resistors R in series between the reference voltage nodes output from the two amplifiers 18. The ladder resistor 19 includes five output nodes connected between stages of the six resistors R connected in series, in addition to two output nodes that output two reference voltages. The gradation voltage generation unit 21 of FIG. 6A outputs a gradation voltage V1 from the output node between the third resistor R and the fourth resistor R from the top in the ladder resistor 19, outputs a gradation voltage V2A from the output node between the second resistor R and the third resistor R from the top, and outputs a gradation voltage V2B from the output node between the fourth resistor R and the fifth resistor R from the top. Furthermore, the gradation voltage generation unit 21 of FIG. 6A outputs a gradation voltage V3A from the output between the first resistor R and the second resistor R from the top in the ladder resistor 19, and outputs a gradation voltage V3B from the output node between the fifth resistor R and the sixth resistor R from the top.

Note that the number of the plurality of resistors R connected in series configuring the ladder resistor 19 is arbitrary. In the present specification, wiring connected to an output node between the resistors R of the ladder resistor 19 is referred to as a gradation voltage line.

Figure 6B:
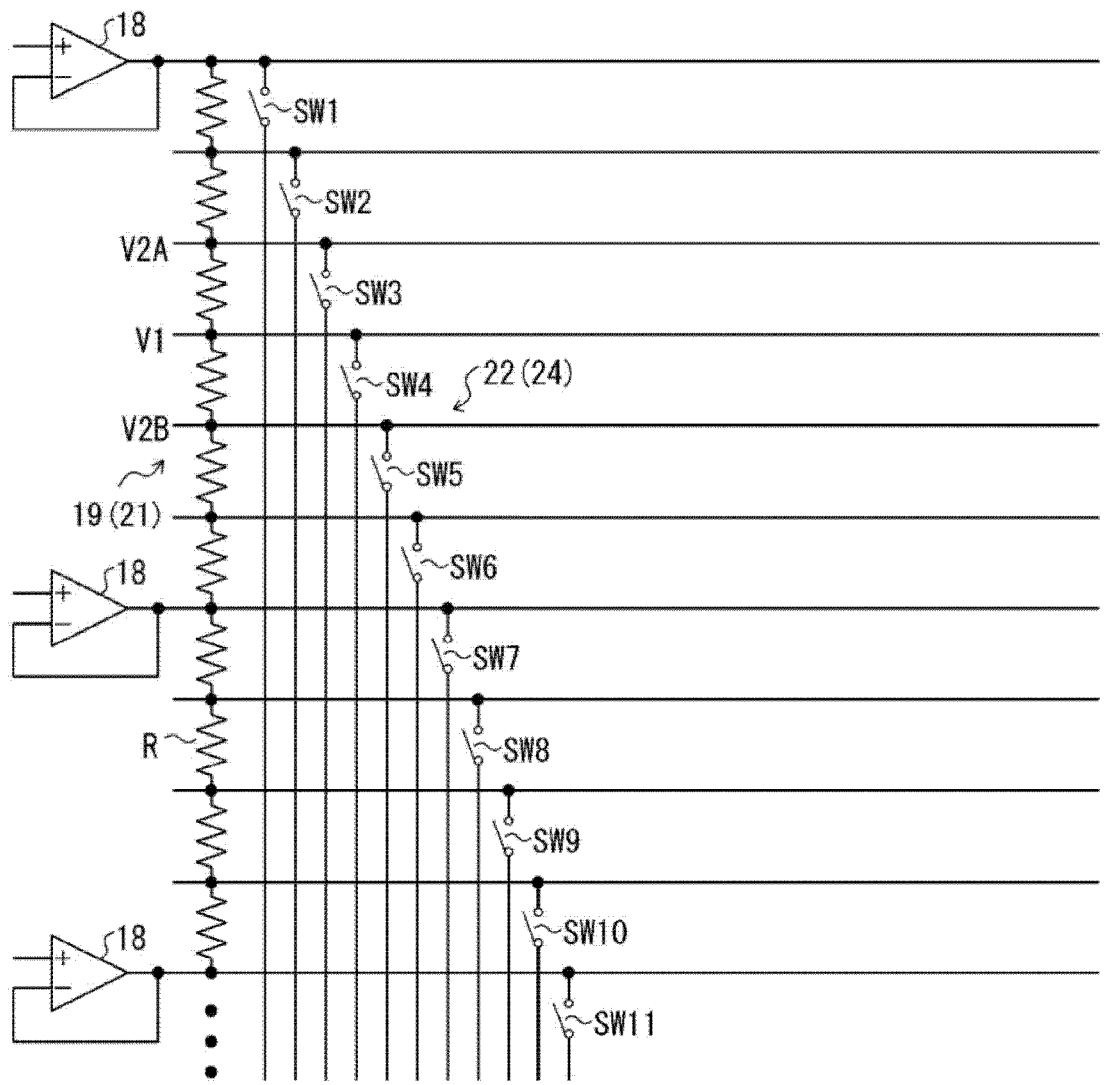
FIG. 6B is a circuit diagram illustrating a modification of a ladder resistor.

In FIG. 6A, only one ladder resistor 19 in which the plurality of resistors R is connected in series is illustrated, but the number of amplifiers 18 may be increased and the amplifiers may be connected by the ladder resistor 19. The number of ladder resistors and the resistance value between amplifiers may be made different for each pair of amplifiers. For example, FIG. 6B is a circuit diagram illustrating a modification of the ladder resistor 19. FIG. 6B illustrates an example in which three amplifiers 18 are connected to the ladder resistor 19, different reference voltages are output from the output nodes of the amplifiers 18, and the number of resistors R connected in series between the output nodes of the amplifiers 18 is made different for each combination of two amplifiers 18. In this manner, the plurality of ladder resistors 19 may be connected in series. It is necessary to add one amplifier 18 every time the number of ladder resistors 19 is increased by one.

The voltage selector 22 selects, from among the plurality of gradation voltages, whether to supply a gradation voltage of the same voltage level as an assumed gradation voltage to a signal line or to supply a gradation voltage close to the assumed gradation voltage to the signal line. For example, the voltage selector supplies a gradation voltage equal to the assumed gradation voltage to one of two signal lines adjacent in a first direction, and supplies a gradation voltage different from the assumed gradation voltage to the other.

More specifically, the voltage selector may select, from among the plurality of gradation voltages, whether to supply a gradation voltage of the same voltage level as the assumed gradation voltage to a signal line or to supply two or more gradation voltages close to the assumed gradation voltage to the signal line by switching the voltages. The two or more gradation voltages close to the assumed gradation voltage include a gradation voltage having a voltage level higher than the assumed gradation voltage and a gradation voltage having a voltage level lower than the assumed gradation voltage. Furthermore, the voltage selector may select whether to continuously supply the gradation voltage of the same level to a signal line in one horizontal line period or to supply two or more gradation voltages to the signal line by switching the voltages in one horizontal line period. The voltage selector 22 includes a decoder 24.

The decoder 24 of FIG. 6A includes seven switches (second switchers) SW1 to SW7 connected to the respective signal lines. The decoder 24 of FIG. 6A turns on any one of the switches SW1 to SW7 on the basis of the gradation signal from the drive IC 6. Among the seven switches SW1 to SW7, three switches SW4, SW3, and SW5 are to select one of the gradation voltages V1, V2A, and V2B output from the ladder resistor 19. In a case where the resistance R values of the plurality of resistors R connected in series in the ladder resistor 19 are equal, V1=(V2A+V2B)/2.

In a case where the same gradation voltages are supplied to two adjacent signal lines, the decoder 24 according to the present embodiment supplies the gradation voltage V1 of the same voltage level as the assumed gradation voltage to one of the two signal lines, and supplies the gradation voltages V2A and V2B close to the assumed gradation voltage to the remaining one signal line by switching the voltages in one horizontal line period. As a result, the number of signal lines driven by one gradation voltage line can be reduced, and insufficient writing of signal lines can be reduced.

A corresponding source amplifier 23 is connected to each signal line. Nodes on one end side of the switches SW1 to SW7 in the decoder 24 are all connected to a non-inverting input node of the source amplifier 23. A capacitor (first capacitor) C_mix and a switch (first switcher) SW11 are connected in parallel between the nodes on one end side and the non-inverting input node of the source amplifier 23. The capacitor C_mix is also called a holding capacitance. An inverting input node of the source amplifier 23 and an output node of the source amplifier 23 are short-circuited. The output node of the source amplifier 23 is an output node of the source driver 15, and is connected to the signal lines of the pixel array unit 14.

The decoder 24 in the source driver 15 of FIG. 6A supplies two or more gradation voltages to at least some signal lines by switching the voltages in one horizontal line period. Furthermore, the decoder 24 may switch the types of gradation voltages supplied to the same signal line in one and the other of two consecutive subframe Sub_FR periods. More specifically, the decoder 24 supplies a gradation voltage equal to the assumed gradation voltage to one of two signal lines adjacent in the first direction, and supplies a gradation voltage different from the assumed gradation voltage to the other. The decoder 24 may supply two or more gradation voltages different from the assumed gradation voltages to the other of the two signal lines by switching the voltages in one horizontal line period.

In the example of FIG. 6A, the switch SW4 is turned on and the gradation voltage V1 is supplied to the signal lines of odd-numbered columns. Furthermore, to the signal lines of even-numbered columns, in one horizontal line period, the switch SW3 is turned on and the gradation voltage V2A is supplied, and then the switch SW5 is turned on and the gradation voltage V2B is supplied.

More specifically, in a case where the signal lines of odd-numbered columns are driven, the decoder 24 turns on the switch SW4 in a state where the switch SW11 is turned on. As a result, the gradation voltage V1 is supplied to one end of the capacitor (holding capacitance) C_mix. Next, by turning off the switch SW11 while keeping the switch SW4 on, the gradation voltage V1 can be continuously written to the corresponding signal lines for one horizontal line period.

Figure 7A:
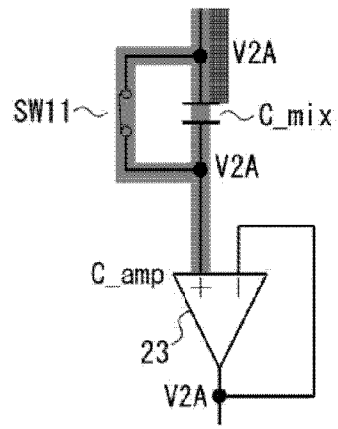
FIG. 7A is a diagram for explaining a procedure of writing a gradation voltage to the signal lines of even-numbered columns of FIG. 6A in one horizontal line period.
Figure 7B:
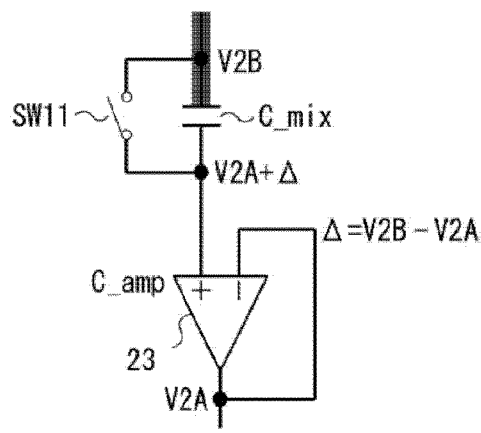
FIG. 7B is a diagram following FIG. 7A.
Figure 7C:
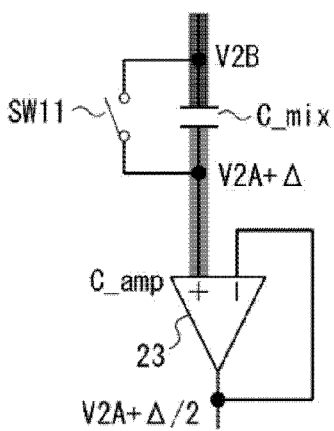
FIG. 7C is a diagram following FIG. 7B.

FIGS. 7A, 7B, and 7C are diagrams for explaining a procedure of writing the gradation voltages V2A and V2B to the signal lines of even-numbered columns of FIG. 6A in one horizontal line period. First, as illustrated in FIG. 7A, in a state where the switch SW11 is turned on, the decoder 24 turns on the switch SW3 and supplies the gradation voltage V2A to one end of the capacitor (holding capacitance) C_mix. Since the switch SW11 is turned on, this voltage is also supplied to the non-inverting input node of the source amplifier 23. As a result, the nodes on both ends of the capacitor (holding capacitance) C_mix become the same voltage level, which is the gradation voltage V2A. At this time, the voltage on one end sides of the capacitor (holding capacitance) C_mix and a parasitic capacitance C_amp of the source amplifier 23 becomes the gradation voltage V2A.

Next, as illustrated in FIG. 7B, in a state where the switch SW11 is turned off, the decoder 24 turns on the switch SW4 and supplies the gradation voltage V2B to one end of the capacitor (holding capacitance) C_mix. As a result, the voltage on the other end side of the capacitor (holding capacitance) C_mix increases by $\Delta$. $\Delta=V2B-V2A$ At this time, in a case where the capacitor (holding capacitance) C_mix and the parasitic capacitance Camp of the source amplifier 23 are the same capacitance, a gradation voltage input to the source amplifier 23 is expressed by the following Formula (1).

$$V2A+\Delta/2=(V2A+V2B)/2 \quad (1)$$

The voltage indicated in formula (1) is a voltage of substantially the same voltage level as the gradation voltage V1. The signal lines of odd-numbered columns and the signal lines of even-numbered columns can be set to substantially the same voltage level while using different gradation voltage lines.

As described above, the source driver 15 of FIG. 6A continuously writes a specific gradation voltage to the signal lines of odd-numbered columns for one horizontal line period, and supplies two kinds of gradation voltages to the signal lines of even-numbered columns by switching the voltages in one horizontal line period and writes a combined voltage. The source amplifier 23, the capacitor (holding capacitance) C_mix, and the switch SW11 of FIG. 6A constitute a voltage combiner. The voltage combiner generates a voltage obtained by combining two or more gradation voltages supplied by switching the voltages in one horizontal line period, and supplies the voltage to the corresponding signal lines.

Note that all signal lines may be provided with a mode of continuously supplying the gradation voltage selected by the decoder 24 for one horizontal line period. In this case, the switch SW11 may be continuously turned on for one horizontal line period.

Figure 8:
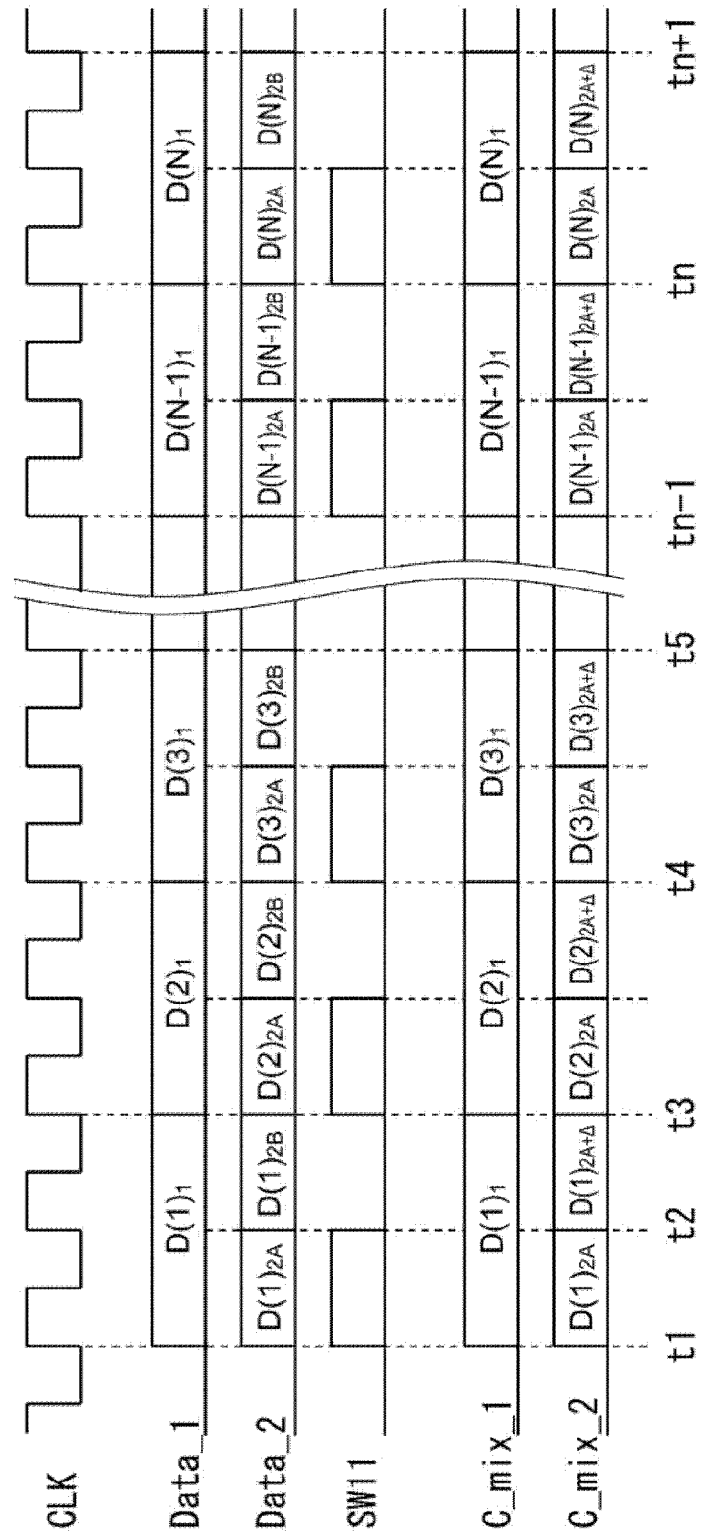
FIG. 8 is a timing diagram of the source driver of FIG. 6A.

FIG. 8 is a timing diagram of the source driver 15 of FIG. 6A. FIG. 8 illustrates drive timings of two signal lines Sig_1 and Sig_2 adjacent in the horizontal direction. In FIG. 8, the gradation signal corresponding to the signal line Sig_1 is Data_1, and the gradation signal corresponding to the signal line Sig_2 is Data_2. Furthermore, FIG. 8 illustrates the logic of the switch SW11 and data held by a capacitor (holding capacitance) C_mix_1 of the signal line Sig_1 and a capacitor (holding capacitance) C_mix_2 of the signal line Sig_2.

Time t1 to t3 of FIG. 8 is one horizontal line period of the head line. The decoder 24 corresponding to the signal line Sig_1 continuously selects a gradation voltage corresponding to a gradation signal D(1)1 for one horizontal line period (time t1 to t3). The electric charge corresponding to this voltage is held in the capacitor (holding capacitance) C_mix_1. The decoder 24 corresponding to the signal line Sig_2 selects the gradation voltage V2A corresponding to a gradation signal D(1)2A in the first half of one horizontal line period (time t1 to t2), and selects the gradation voltage V2B corresponding to a gradation signal D(1)2B in the second half (time t2 to t3). The capacitor (holding capacitance) C_mix holds the electric charge corresponding to the gradation signal D(1)2A in the first half of one horizontal line period (time t1 to t2), and holds the charge corresponding to the gradation signal D(1)2B in the second half (time t2 to t3).

As a result, in a case where the gradation signals of the signal lines Sig_1 and Sig_2 are the same, voltage V1 of the same voltage level is held for both the signal lines. However, a gradation voltage line for supplying the gradation voltage V1 is connected to the signal line Sig_1, and a gradation voltage line for supplying the gradation voltage V2A and a gradation voltage line for supplying the gradation voltage V2B are alternately connected to the signal line Sig_2. As a result, the load capacitance of each gradation voltage line can be suppressed, and insufficient writing of the signal lines Sig_1 and Sig_2 does not occur.

The above operation is repeated for each horizontal line. Time t3 to t5 indicate the drive timing of the second horizontal line, time t5 to t6 indicate the drive timing of the third horizontal line, time tn−1 to tn indicate the drive timing of the (n−1)-th horizontal line, and time tn to tn+1 indicate the drive timing of the nth horizontal line.

The timing diagram of FIG. 8 illustrates an example in which all signal lines are simultaneously driven for each horizontal line in one subframe Sub_FR. When display of one subframe Sub_FR ends, the source driver 15 of FIG. 6A simultaneously drives all signal lines for each horizontal line at timings similar to those in FIG. 8 for the next subframe Sub_FR.

The source driver 15 of FIG. 6A continuously supplies the same gradation voltage to the signal lines for one horizontal line period without switching the gradation voltage for the signal lines of odd-numbered column, whereas the source driver switches gradation voltages during one horizontal line period and supplies the combined voltage of the two gradation voltages to the signal lines for the signal lines of even-numbered columns. The gradation voltage V1 and the gradation voltage (V2A+V2B)/2 should ideally be at the same voltage level, but deviation may occur between the gradation voltage V1 and the gradation voltage (V2A+V2B)/2 due to resistor R variation among the resistors R in the ladder resistor 19, variation in parasitic capacitance among the gradation voltage lines, or the like.

If deviation occurs between signal line voltages despite the same gradation voltage, color unevenness occurs and image quality deteriorates. Accordingly, the methods of driving the gradation voltages of the two adjacent signal lines Sig_1 and Sig_2 may be reversed for each frame FR or subframe Sub_FR.

Figure 9:
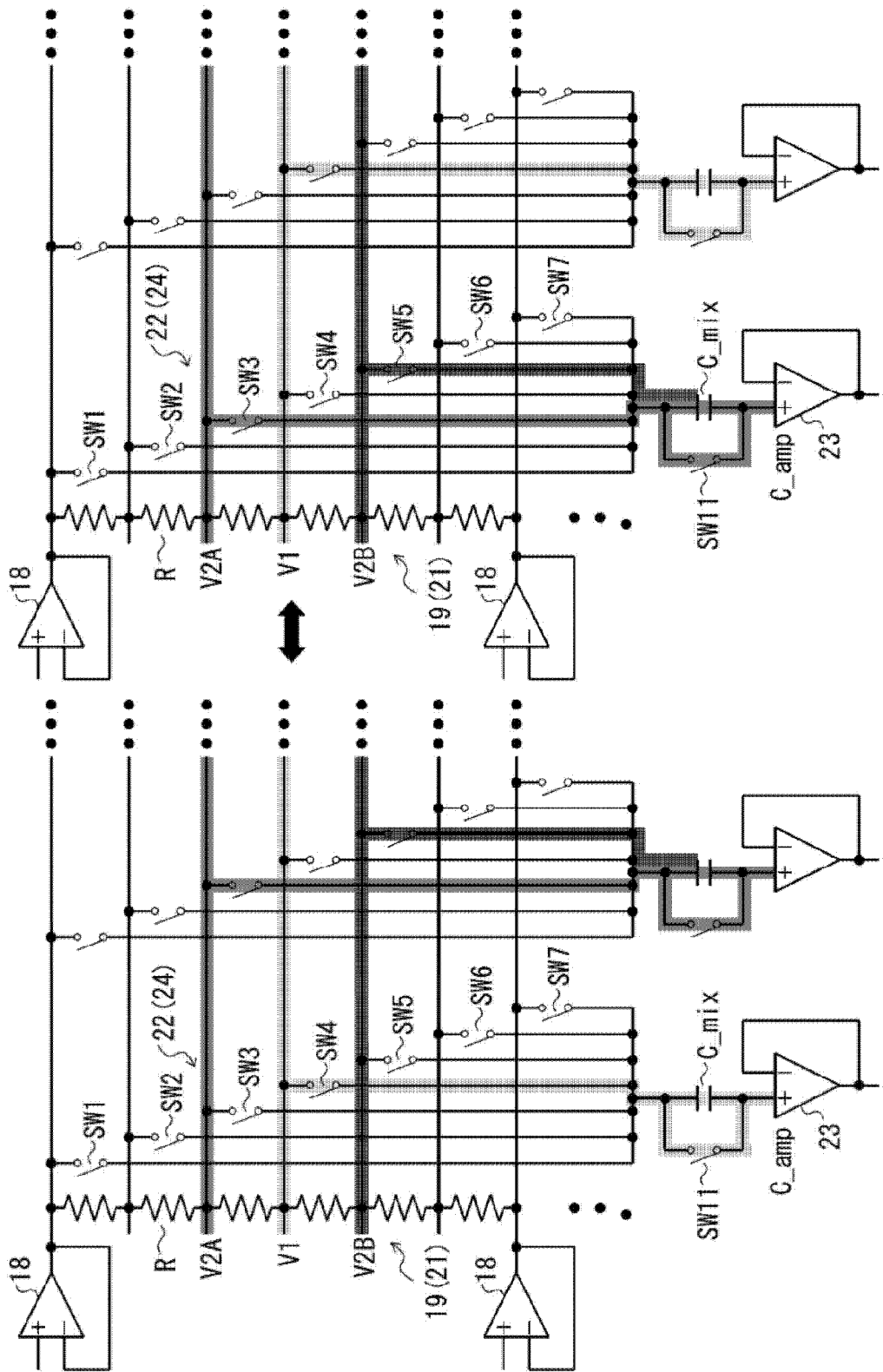
FIG. 9 is a diagram illustrating an example in which methods of driving gradation voltages of two adjacent signal lines are reversed for each subframe.

FIG. 9 is a diagram illustrating an example in which the methods of driving the gradation voltages of two adjacent signal lines are reversed for each subframe Sub_FR. The left side in FIG. 9 is similar to FIG. 6A. The gradation voltage V1 that is an assumed gradation voltage is continuously supplied to the signal line Sig_1 for one horizontal line period, and two gradation voltages V2A and V2B approximate to the assumed gradation voltage are supplied to the signal line Sig_2 by switching the voltages during one horizontal line period.

If display for one subframe Sub_FR is performed by the method on the left side in FIG. 9, display is performed by the method on the right side in FIG. 9 in the next one subframe Sub_FR. In the right side in FIG. 9, contrary to the left side in FIG. 9, two gradation voltages V2A and V2B approximate to the assumed gradation voltage are supplied to the signal line Sig_1 by switching the voltages during one horizontal line period, and the gradation voltage V1 that is the assumed gradation voltage is continuously supplied to the signal line Sig_2 for one horizontal line period.

As described above, in FIG. 9, since whether a fixed gradation voltage is supplied to each signal line or a combined voltage of two gradation voltages is supplied is switched for each subframe Sub_FR, variation in gradation voltages between two adjacent signal lines is inconspicuous.

In the source driver 15 of FIG. 6A, the electric charge corresponding to the gradation voltage is accumulated in the parasitic capacitance C_amp of the source amplifier 23 and the capacitor (holding capacitance) C_mix. However, an additional capacitor C_mix_ex may be provided.

Figure 10:
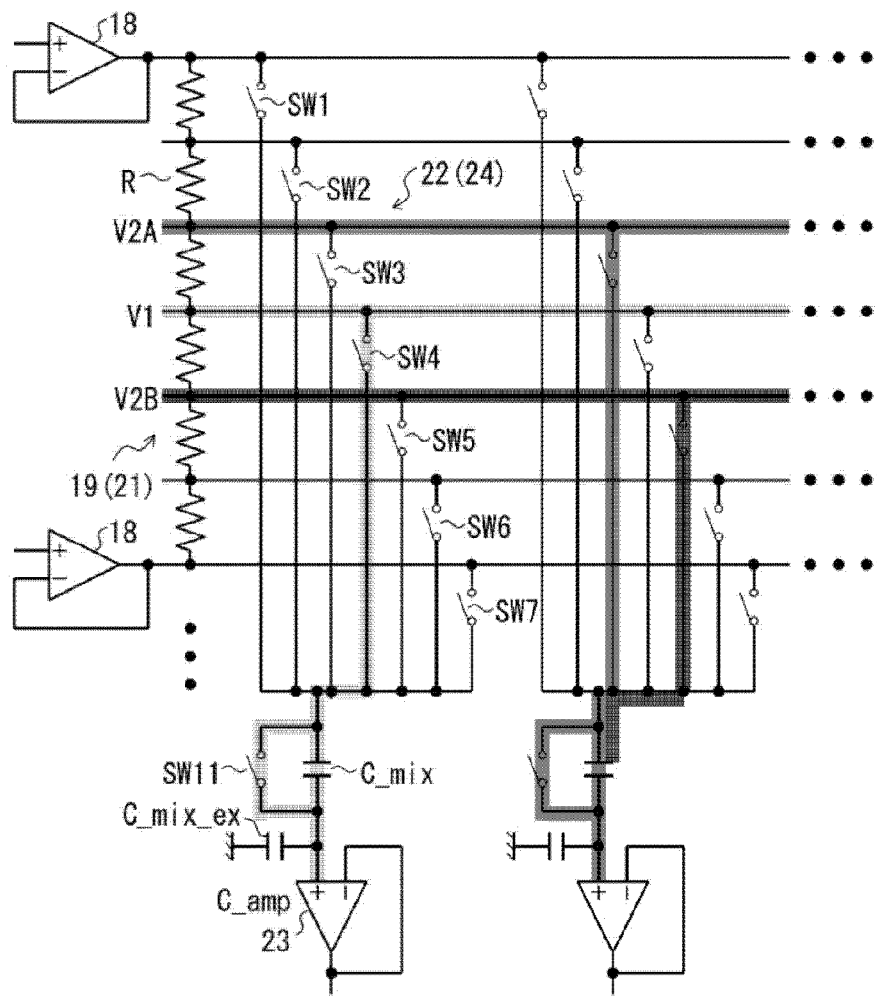
FIG. 10 is a block diagram of a modification of the source driver of FIG. 6A.

FIG. 10 is a block diagram of a modification of the source driver 15 of FIG. 6A. The source driver 15 of FIG. 10 includes the capacitor (second capacitor) C_mix_ex connected between the non-inverting input node of the source amplifier 23 and a ground node. By newly providing the capacitor C_mix_ex, the voltages of signal lines can be adjusted. It is desirable that the combined capacitance of the capacitor C_mix_ex and the parasitic capacitance C_amp of the source amplifier 23 is equal to the capacitor (combined capacitance) C_mix.

Figure 11:
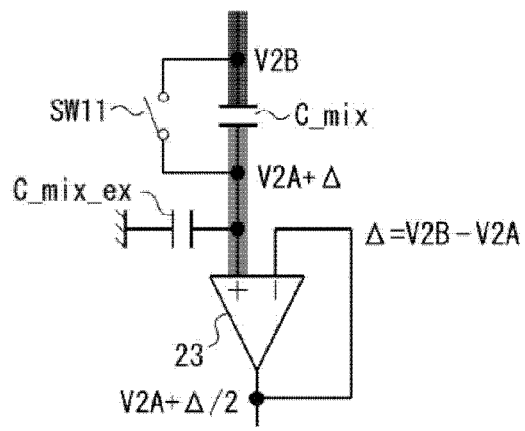
FIG. 11 is a diagram illustrating a voltage change at the input and output nodes of the source amplifier of FIG. 10.

FIG. 11 is a diagram illustrating a voltage change at the input and output nodes of the source amplifier 23 of FIG. 10. First, in a state where the switch SW11 is turned off, if the decoder 24 selects the gradation voltage V2A, both the voltage on one end side of the capacitor (holding capacitance) C_mix and the non-inverting input node of the source amplifier 23 are V2A. Thereafter, in a state where the switch SW11 is turned off, if the decoder 24 selects the gradation voltage V2B, the voltage on one end side of the capacitor (holding capacitance) C_mix is V2A+V2B. Therefore, if Δ=V2B−V2A, the output of the source amplifier 23 is V2A+Δ/2=(V2A+V2B)/2, similarly to formula (1).

In FIG. 6A, an example is illustrated in which the decoder 24 selects any of the specific gradation voltages V1, V2A, and V2B in the ladder resistor 19 in which six resistors R are connected in series. However, the decoder 24 may select another gradation voltage. For example, for the signal lines of even-numbered columns, as illustrated in FIG. 6A, a combined voltage may be generated using the gradation voltage V3A that is immediately above the gradation voltage V2A and the gradation voltage V3B that is immediately below the gradation voltage V2B. In this case, a combined voltage may be generated by switching and selecting a total of four voltages of the gradation voltages V3A, V2A, V2B, and V3B in one horizontal line period, or a combined voltage may be generated by switching and selecting the gradation voltages V3A and V3B in one horizontal line period.

Furthermore, in FIG. 6A, the methods of driving the gradation voltages are made different between the signal lines of odd-numbered columns and the signal lines of even-numbered columns. However, with n (n is an integer of 3 or more) signal lines as a unit, the methods of driving the gradation voltages of n signal lines may be made different. For example, with three signal lines as a unit, an assumed gradation voltage may be continuously supplied to one of the three signal lines for one horizontal line period, the gradation voltages V2A and V2B may be supplied to a remaining one of the signal lines by switching the voltages during one horizontal line period, and the gradation voltages V3A and V3B may be supplied to the last one signal line by switching the voltages during one horizontal line period.

As described above, in the first embodiment, a gradation voltage of the same voltage level as an assumed gradation voltage is continuously supplied to one of two adjacent signal lines for one horizontal line period, and a plurality of gradation voltages close to the assumed gradation voltage is supplied to the remaining one signal line by switching the voltages during one horizontal line period. As a result, a large number of signal lines are not driven by only some gradation voltage lines of a plurality of gradation voltage lines output from the ladder resistor 19, and each signal line can be driven in a distributed manner by each gradation voltage line. Therefore, the load capacitance of each gradation voltage line can be reduced, and insufficient writing of signal lines does not occur. As a result, high-speed writing to each signal line becomes possible, and improvement in the image quality of the display device 1 of high resolution can be achieved.

Second Embodiment

The source driver 15 according to the first embodiment supplies a plurality of gradation voltages to the signal lines by switching the voltages during one horizontal line period, generates a combined voltage obtained by combining the plurality of gradation voltages by the capacitor (holding capacitance) C_mix connected to the source amplifier 23 and the parasitic capacitance, and supplies the combined voltage to the signal lines. However, a combined voltage may be generated by the pixel array unit 14 instead of the source driver 15.

A display device 1 according to the second embodiment has a block configuration similar to that in FIG. 4 or 5. The display device 1 according to the second embodiment is different from the first embodiment in part of internal configurations of a source driver 15 and a pixel array unit 14 therein.

Figure 12:
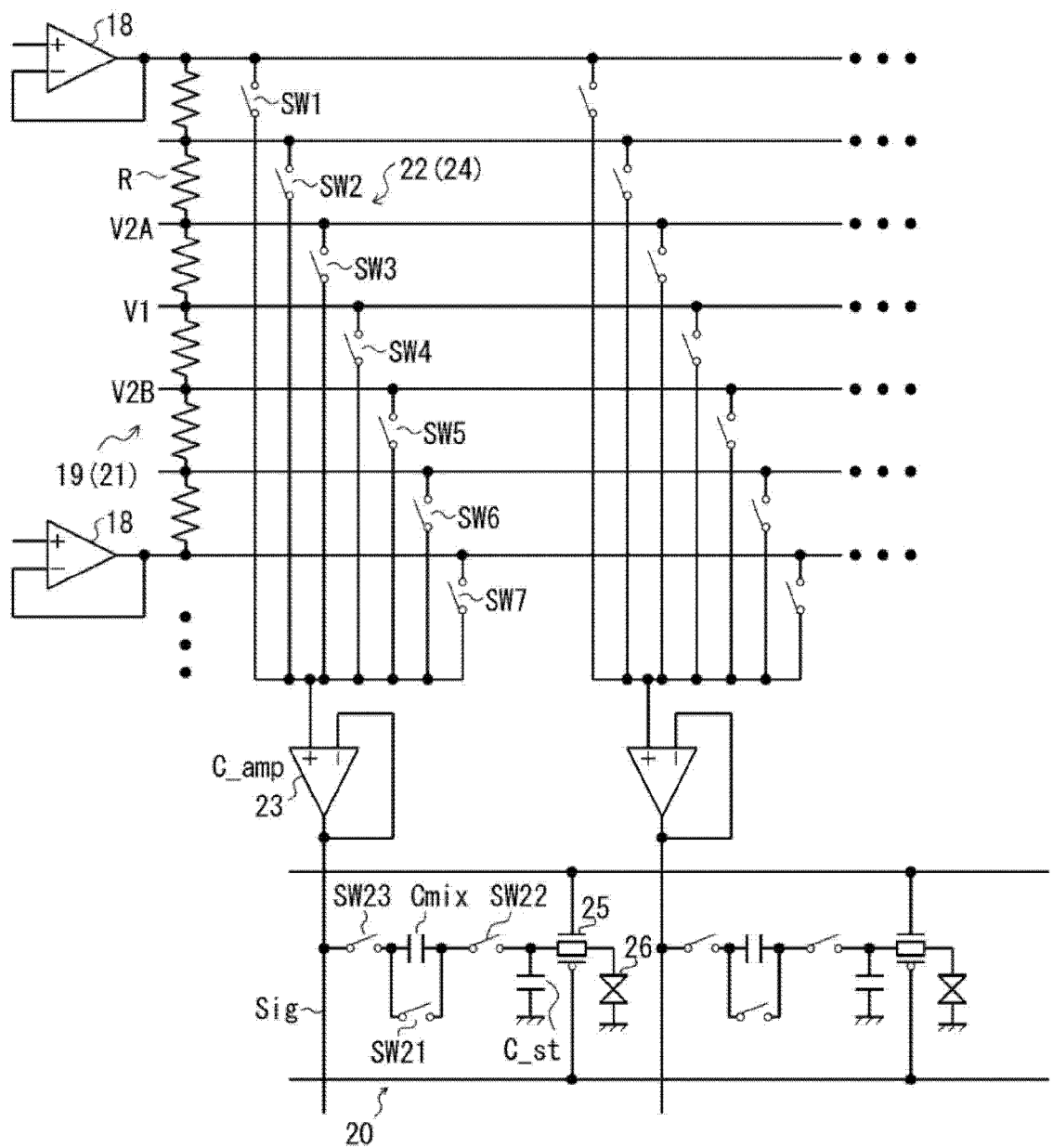
FIG. 12 is a circuit diagram illustrating the main parts of a source driver and a pixel array unit according to a second embodiment.

FIG. 12 is a circuit diagram illustrating the main parts of the source driver 15 and the pixel array unit 14 according to the second embodiment. A capacitor (holding capacitance) C_mix and a switch SW11 such as those in FIG. 6A are not connected to the non-inverting input node of an amplifier 18 in the source driver 15 of FIG. 12. Furthermore, signal lines connected to an output node of the source driver 15 are connected to a corresponding pixel 20 in the pixel array unit 14. The pixel 20 includes switches SW21, SW22, and SW23, a capacitor C_mix, a capacitor C_st, a transfer gate 25, and a liquid crystal element 26. The switch SW23 switches whether or not to connect the pixel 20 to the signal lines Sig. One end of the switch SW23 is connected to the signal lines Sig, and the other end is connected to one end of the switch SW21 and one end of the capacitor C_mix. The other end of the switch SW21 and the other end of the capacitor C_mix are connected to one end of the switch SW22. The other end of the switch SW22 is connected to an input node of the transfer gate 25 and one end of the capacitor C_st. The other end of the capacitor C_st is grounded. The liquid crystal element 26 is connected to the other end of the transfer gate 25.

When the gradation data of a row to be written to by a decoder 24 is output to the signal lines Sig, the switch SW23 corresponding to the row is turned on. As a result, the gradation data on the signal lines Sig can be written to the pixel 20 of the corresponding row in units of rows. In this manner, only the switch SW23 connected to the pixel 20 of the row to be written to is turned on. The behavior of the switches SW21 to SW23 changes for each row.

Furthermore, for example, in the signal lines of odd-numbered columns, the decoder 24 continuously selects a gradation voltage of the same voltage level as an assumed gradation voltage for one horizontal line period. This gradation voltage is supplied to a corresponding signal line via the corresponding amplifier 18. By turning on both of the switches SW21 and SW23 in the pixel 20, the electric charge corresponding to the gradation voltage supplied to the signal line is accumulated in the capacitor C_mix. Thereafter, by turning off the switch SW23 and turning on the switches SW21 and SW22, the accumulated electric charge of the capacitor C_mix is transferred to the capacitor C_st, and the liquid crystal element 26 is driven by the electric charge accumulated in the capacitor C_st.

In the signal lines of even-numbered columns, the decoder 24 switches the selection of two gradation voltages V2A and V2B approximate to the assumed gradation voltage during one horizontal line period. For example, by turning on both of the switches SW21 and SW22 while the gradation voltage V2A is being selected, the electric charge corresponding to the gradation voltage V2A is accumulated in the capacitor C_st. Next, with a switch switcher selecting the gradation voltage V2B, by turning off the switch SW21 and turning on the switch SW22, the electric charge corresponding to the combined voltage of the gradation voltages V2A and V2B is accumulated in the capacitor C_st.

Figure 13:
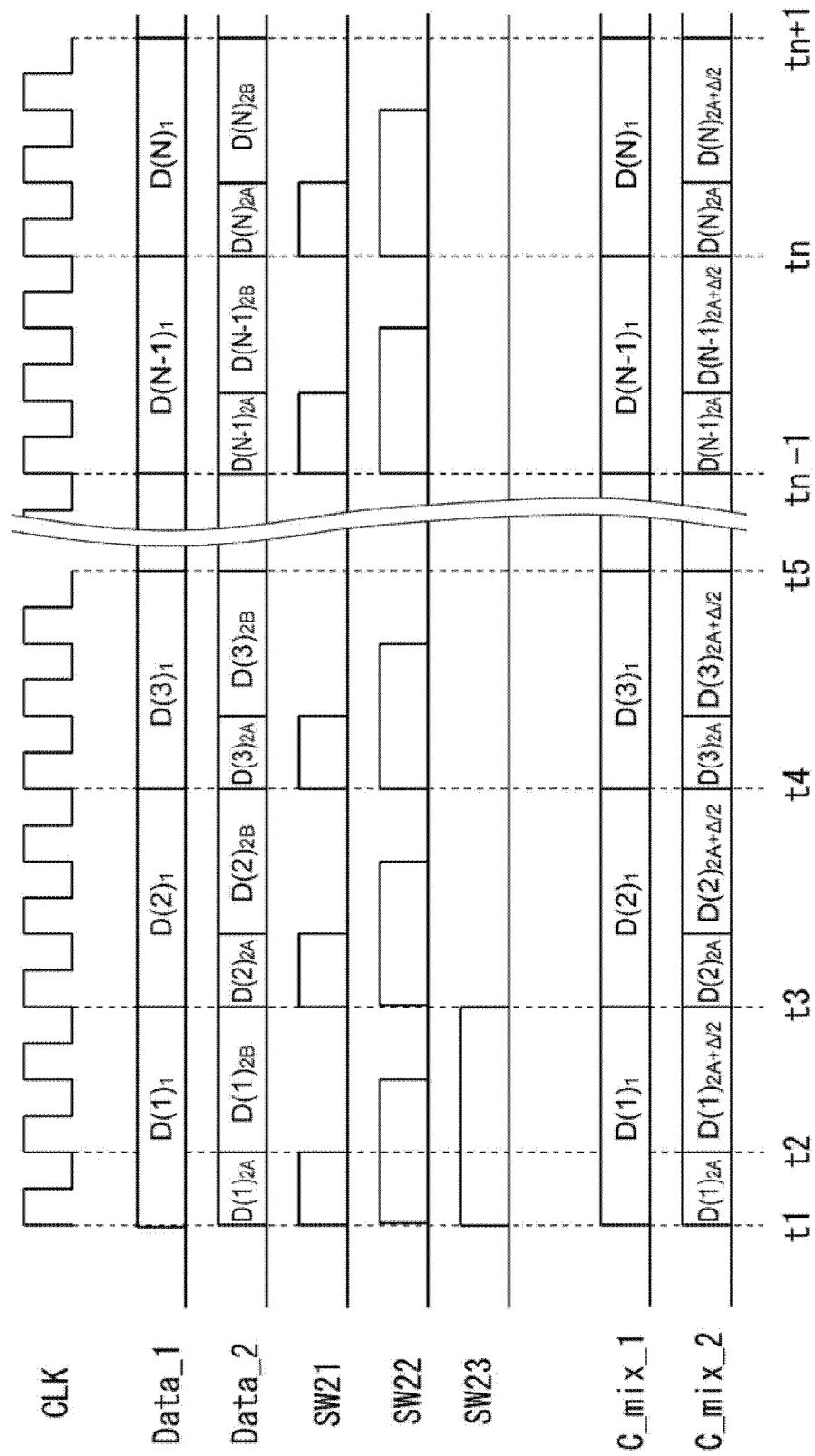
FIG. 13 is a timing diagram of the display device of FIG. 12.

FIG. 13 is a timing diagram of the display device 1 of FIG. 12. In FIG. 13, the capacitors C_st in the pixels 20 connected to the signal lines of odd-numbered columns and even-numbered columns are denoted as C_st1 and C_st2, respectively. Time t1 to t3 is one horizontal line period. In one horizontal line period of time t1 to t3, gradation data D(1)1 of the y-th row is supplied to the display device 1, and a gradation voltage V1 corresponding to the gradation data D(1)1 is written to a signal line Sig_1. Furthermore, in the first half of this one horizontal line period (time t1 to t2), the gradation voltage V2A corresponding to gradation data D(1)2A is written to a signal line Sig_2 adjacent to the signal line Sig_1. Subsequently, in the second half of one horizontal line period (time t2 to t3), the gradation voltage V2B corresponding to gradation data D(1)2B is written to the signal line Sig_2. As a result, a combined voltage obtained by combining the gradation voltages V2A and V2B is applied to the liquid crystal element 26.

On the other hand, during time t3 to t4, gradation data D(2)2 of the (y+1)-th row is supplied to the display device 1. In this case, the switch SW23 of the y-th row is turned off, and gradation data is not written to the pixel 20 of the y-th row. In this manner, the switch SW23 is turned on only in a case where gradation data is written to the pixel 20 of the corresponding row.

A similar process is performed for time t3 onward. In each horizontal line period, the signal lines of odd-numbered columns are driven with a gradation voltage in one horizontal line period fixed, and the signal lines of even-numbered columns are driven by switching gradation voltages in one horizontal line period.

Figure 14:
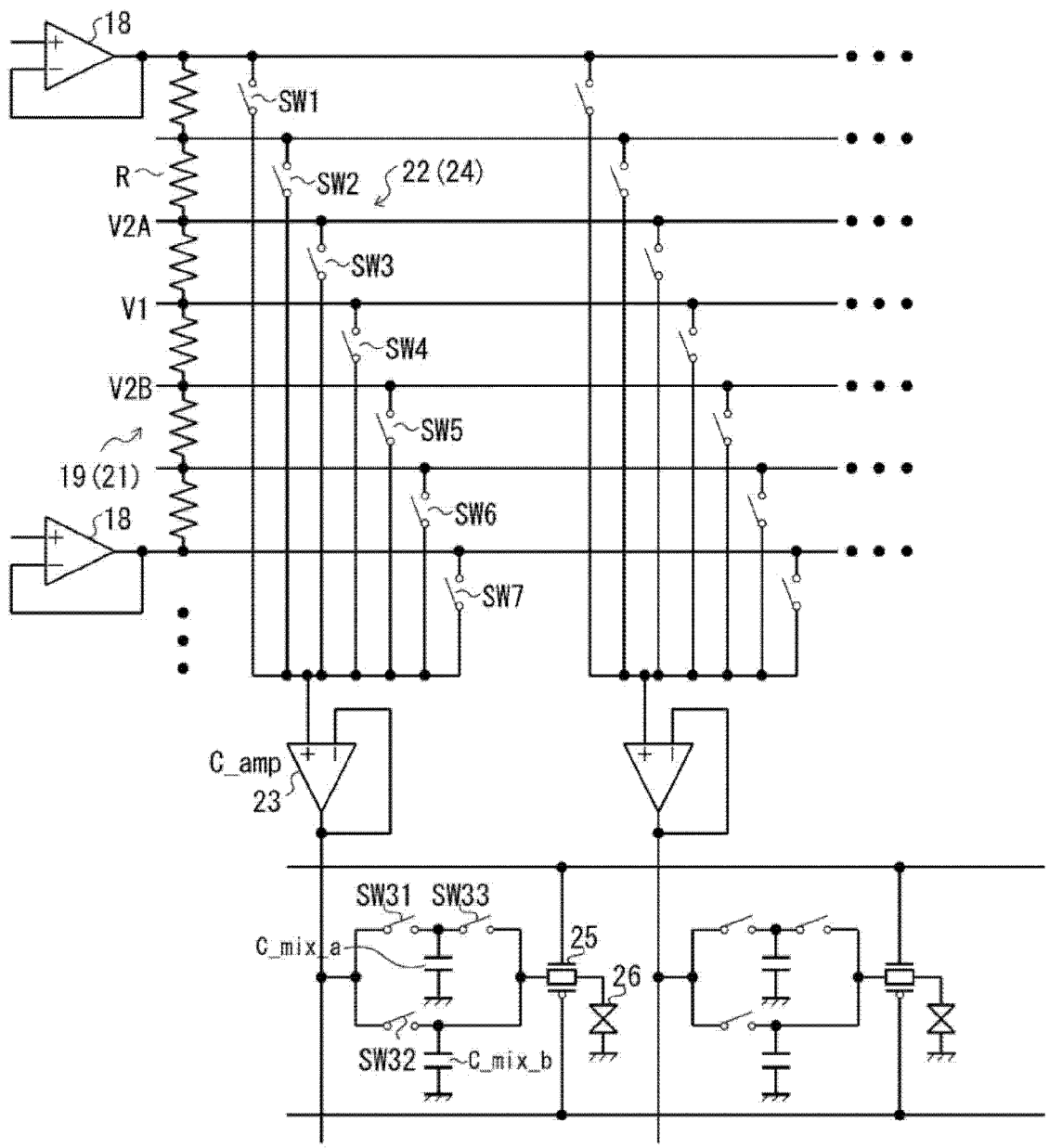
FIG. 14 is a block diagram of a modification of the pixel array unit of FIG. 12.

The internal configuration of the pixel 20 in the pixel array unit 14 of FIG. 12 is merely an example, and various modifications are conceivable. FIG. 14 is a block diagram of a modification of the pixel array unit 14 of FIG. 12. Each pixel 20 in the pixel array unit 14 of FIG. 14 includes switches SW31 to SW33, a capacitor C_mix_a, a capacitor C_mix_b, the transfer gate 25, and the liquid crystal element 26. The switches SW31 and SW33 are connected in series between the signal lines Sig and the input node of the transfer gate 25. Furthermore, the switch SW32 is connected between the signal lines and the input node of the transfer gate 25. The capacitor C_mix_a is connected between a connection node of the switches SW31 and SW33 and a ground node. The capacitor C_mix_b is connected between a connection node of the switch SW32 and the input node of the transfer gate 25 and the ground node.

When the gradation data of a row to be written to by the decoder 24 is output to the signal lines Sig, the switches SW31 to SW33 corresponding to the row are sequentially turned on. As a result, the gradation data on the signal lines Sig can be written to the pixel 20 of the corresponding row in units of rows. In this manner, only the switches SW31 to SW33 connected to the pixel 20 of a row to be written to are turned on. The behavior of the switches SW31 to SW33 changes for each row.

Figure 15:
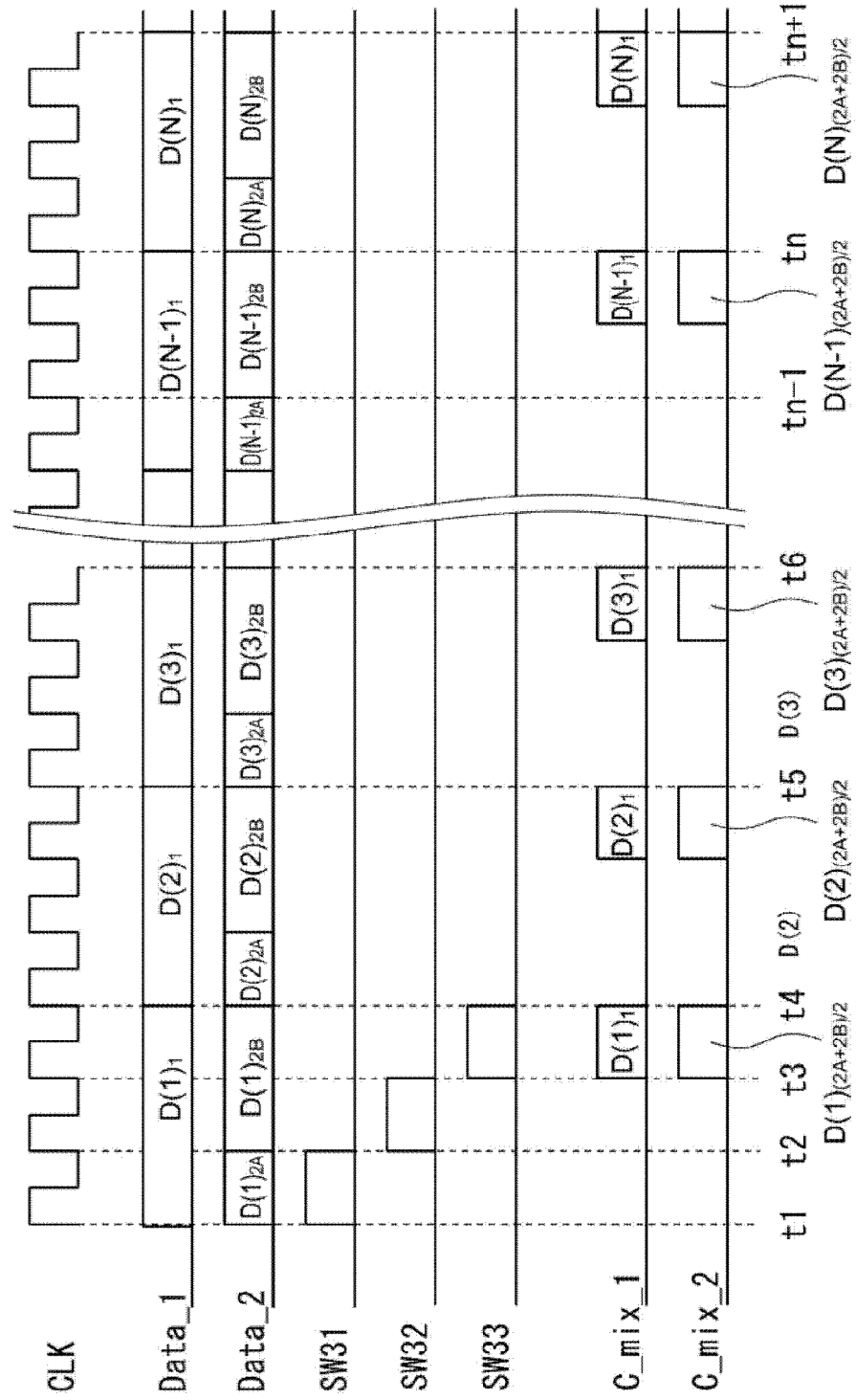
FIG. 15 is a timing diagram of the display device of FIG. 14.

FIG. 15 is a timing diagram of the display device 1 of FIG. 14. In FIG. 15, data applied to the liquid crystal elements 26 in the pixels 20 connected to the signal lines of odd-numbered columns and even-numbered columns are denoted as LC_Data_1 and LC_Data_2, respectively. Time t1 to t4 of FIG. 15 is one horizontal line period. In time t1 to t2, when the gradation data of a row to be written to by the decoder 24 is output to the signal lines Sig, the switch SW31 of the corresponding row is turned on, and the switches SW32 and SW33 are turned off.

The decoder 24 corresponding to the signal line Sig_1 of an odd-numbered column continuously selects, for example, the gradation voltage V1 for one horizontal line period. The gradation voltage V1 is supplied to the signal line Sig_1 via a source amplifier 23. The switches SW31 and SW32 in the corresponding pixel 20 of the pixel array unit 14 are turned on in different times (time t1 to t2, time t2 to t3), and the switch SW33 is turned off. As a result, each of the capacitors C_mix_a and C_mix_b accumulates the electric charge corresponding to the gradation voltage V1. Thereafter, in time t3 to t4, by turning off the switches SW31 and SW32 and turning on the switch SW33, voltages LC_Data_1 and LC_Data_2 corresponding to the accumulated electric charge of the capacitors C_mix_a and C_mix_b are applied to the liquid crystal element 26 via the transfer gate 25, and display is performed.

Furthermore, the decoder 24 corresponding to the signal line Sig_2 of an even-numbered column switches and selects, for example, the gradation voltages V2A and V2B in one horizontal line period (time t1 to t2, t2 to t3). The switch SW31 is turned on and the switches SW32 and SW33 are turned off while the gradation voltage V2A is being selected by the decoder 24 (time t1 to t2), and the electric charge corresponding to the gradation voltage V2A is accumulated in the capacitor C_mix_a. Thereafter, the switch SW32 is turned on and the switches SW31 and SW33 are turned off while the gradation voltage V2B is being selected by the decoder 24 (time t2 to t3), and the electric charge corresponding to the gradation voltage V2B is accumulated in the capacitor C_mix_b. Thereafter, by turning off the switches SW31 and SW32 and turning on the switch SW33 (time t3 to t4), the liquid crystal element 26 is driven with a voltage corresponding to the electric charge accumulated in the capacitors C_mix_a and C_mix_b.

In the display device 1 of FIGS. 12 and 14, the method of driving the signal lines of odd-numbered columns and the method of driving the signal lines of even-numbered columns may be interchanged for each frame FR or subframe Sub_FR. As a result, color unevenness can be suppressed, and improvement in image quality can be achieved.

As described above, in the second embodiment, since the capacitors C_mix_a and C_mix_b and the switches SW31 and SW32 are provided in each pixel 20 in the pixel array unit 14 and gradation voltages are combined instead of providing the capacitor C_mix and the switch SW11 inside the source driver 15 and combining gradation voltages, the internal configuration of the source driver 15 can be simplified and the source driver 15 can be downsized.

Third Embodiment

In the first and second embodiments described above, one decoder 24 is provided for each signal line. However, a plurality of decoders 24 may be provided for each signal line.

Figure 16:
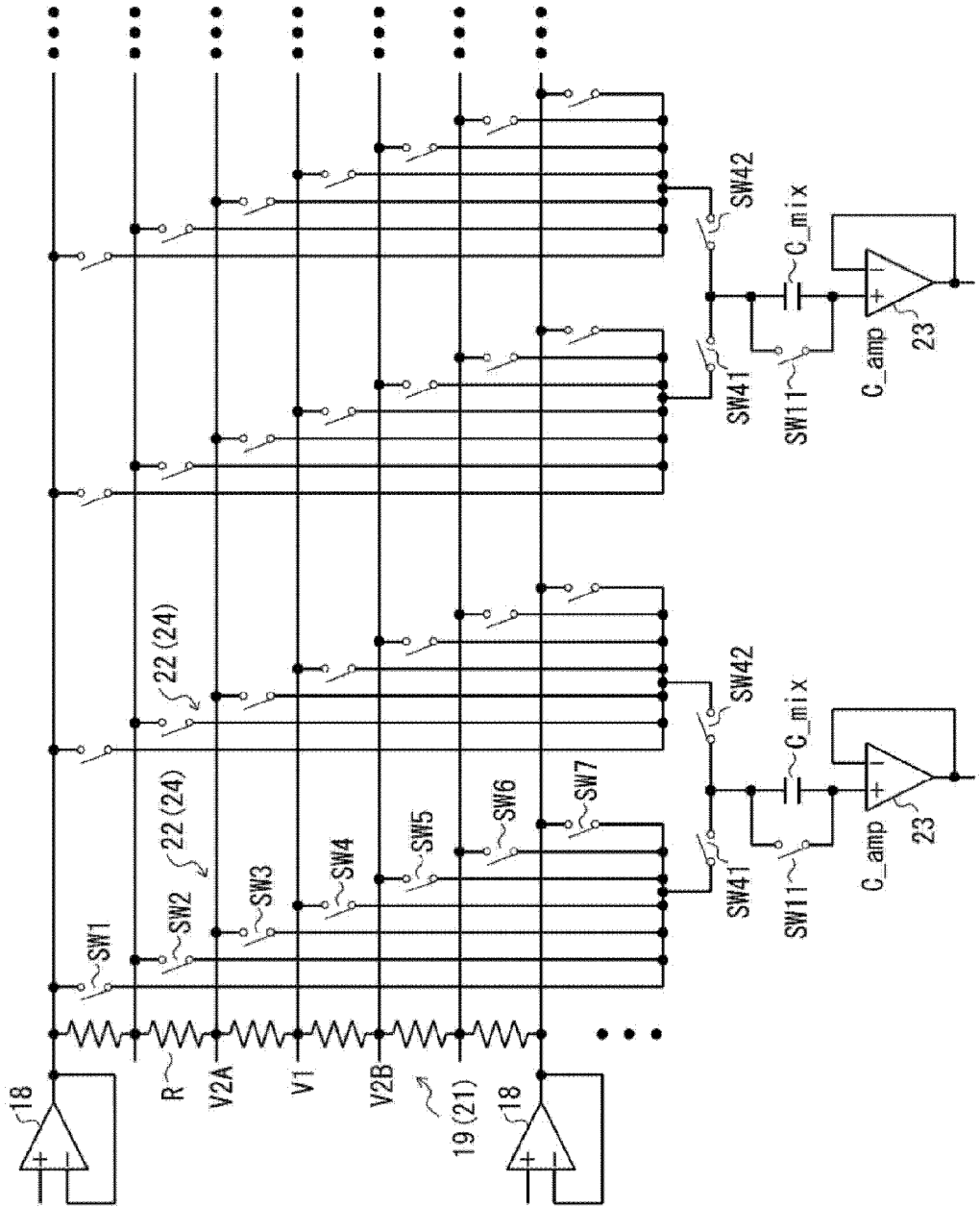
FIG. 16 is a circuit diagram illustrating an internal configuration of a source driver in a display device according to a third embodiment.
Figure 17:
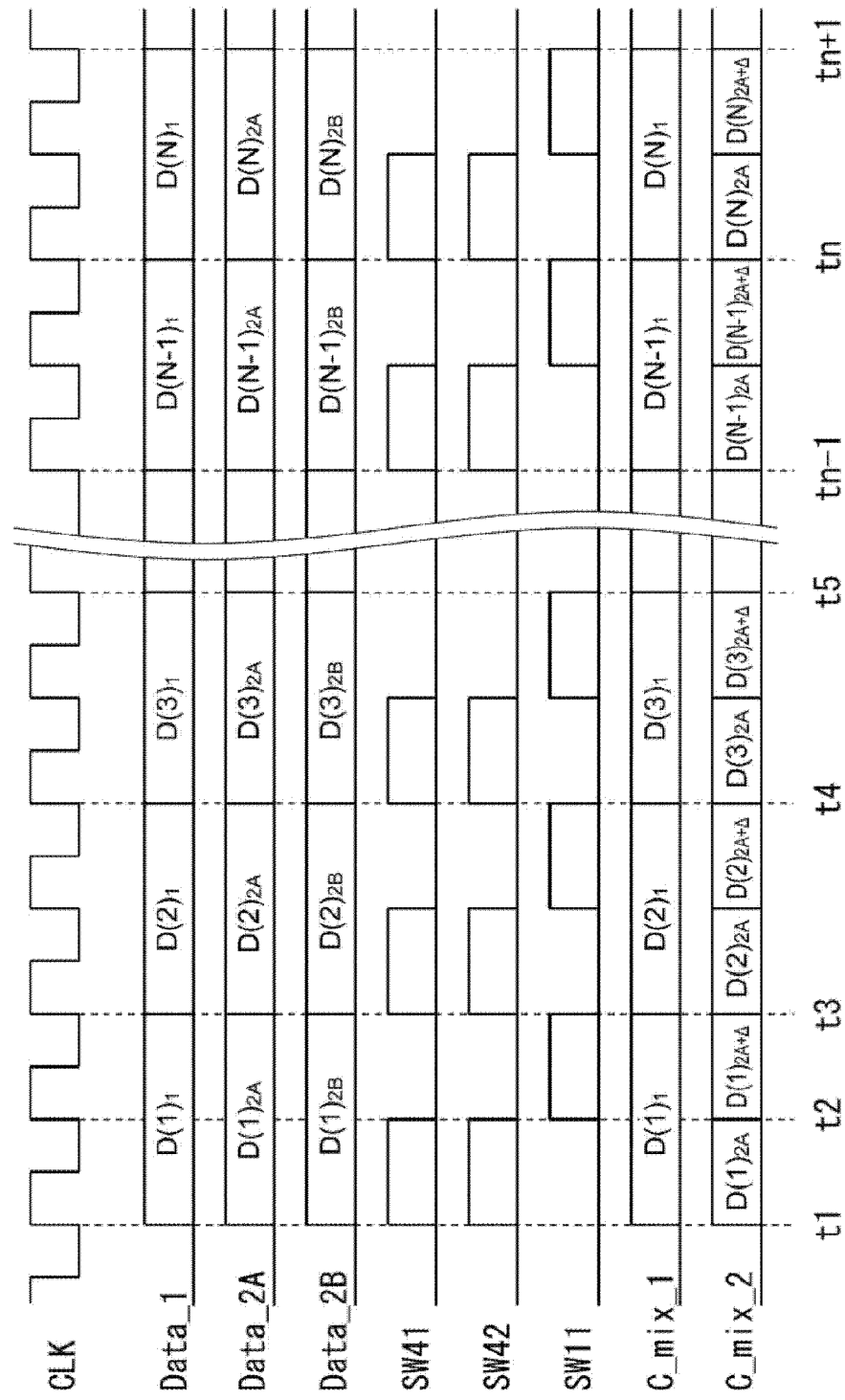
FIG. 17 is a timing diagram of the source driver of FIG. 16.

FIG. 16 is a circuit diagram illustrating an internal configuration of a source driver 15 in a display device 1 according to the third embodiment, and FIG. 17 is a timing diagram of the source driver 15 of FIG. 16. The source driver 15 of FIG. 16 includes a plurality of decoders 24 for each signal line. Furthermore, the source driver 15 of FIG. 16 includes, for each signal line, voltage switchers SW41 and SW42 that switch a plurality of gradation voltages selected by the plurality of decoders 24 and supply the same to the signal line. The voltage switchers SW41 and SW42 can switch and select any one of the output nodes of the plurality of decoders 24 for each signal line. As a result, for each signal line, the gradation voltage selected by any one of the plurality of decoders 24 is supplied to the signal line.

One ends of the voltage switchers SW41 and SW42 are connected to one ends of the switch SW11 and the capacitor (holding capacitance) C_mix, similarly to the source driver 15 of FIG. 6A.

For example, one of the plurality of decoders 24 provided for each signal line selects a gradation voltage of the same voltage level as an assumed gradation voltage (for example, V1). For example, a remaining one of the plurality of decoders 24 switches and selects gradation voltages of voltage levels close to the assumed gradation voltage (for example, V2A and V2B) in one horizontal line period.

For example, the voltage switchers SW41 and SW42 select the output of the decoder 24 that outputs the gradation voltage V1 for the signal lines of odd-numbered columns, and select the output of the decoder 24 that switches and outputs the gradation voltages V2A and V2B for the signal lines of even-numbered columns.

As illustrated in the timing diagram of FIG. 17, in a period in which the voltage switcher SW41 is turned on in the signal lines of odd-numbered columns, the voltage switcher SW42 is turned on in the signal lines of even-numbered columns. In this case, the gradation voltage V1 of the same voltage level as the assumed gradation voltage is continuously supplied to the signal lines of odd-numbered columns for one horizontal line period. Furthermore, the gradation voltages V2A and V2B of voltage levels close to the assumed gradation voltage are supplied to the signal lines of even-numbered columns by switching the voltages during one horizontal line period. On the other hand, in the next subframe, in a period in which the voltage switcher SW42 is turned on in the signal lines of odd-numbered columns, the voltage switcher SW41 is turned on in the signal lines of even-numbered columns. In this case, the gradation voltages V2A and V2B of voltage levels close to the assumed gradation voltage are supplied to the signal lines of odd-numbered columns by switching the voltages during one horizontal line period. Furthermore, the gradation voltage V1 of the same voltage level as the assumed gradation voltage is continuously supplied to the signal lines of even-numbered columns for one horizontal line period.

In the first and second embodiments, it is necessary to finely switch and control the gradation voltages selected by the decoder 24 since only one decoder 24 is provided for each signal line. However, in the present embodiment, since the plurality of decoders 24 is provided for each signal line, the selection operation of the individual decoders 24 can be simplified.

In two adjacent frames FR or subframes Sub_FR, the voltage switchers SW41 and SW42 may make different selections as to which of the gradation voltages output from the plurality of decoders 24 is to be supplied to the signal lines. For example, in a certain subframe Sub_FR, the decoder 24 that supplies the gradation voltage V1 to a signal line Sig_1 is selected and the decoder 24 that switches and supplies the gradation voltages V2A and V2B to an adjacent signal line Sig_2 is selected, whereas in the next subframe Sub_FR, the decoder 24 that switches and supplies the gradation voltages V2A and V2B to the signal line Sig_1 may be selected and the decoder 24 that supplies the gradation voltage V1 to the signal line Sig_2 may be selected.

As described above, in the third embodiment, since the plurality of decoders 24 and the voltage switchers SW41 and SW42 are provided for each signal line, the selection operation of the decoder 24 can be simplified, and the selection of a gradation voltage can be finely performed for each signal line or each subframe Sub_FR.

Fourth Embodiment

Figure 18:
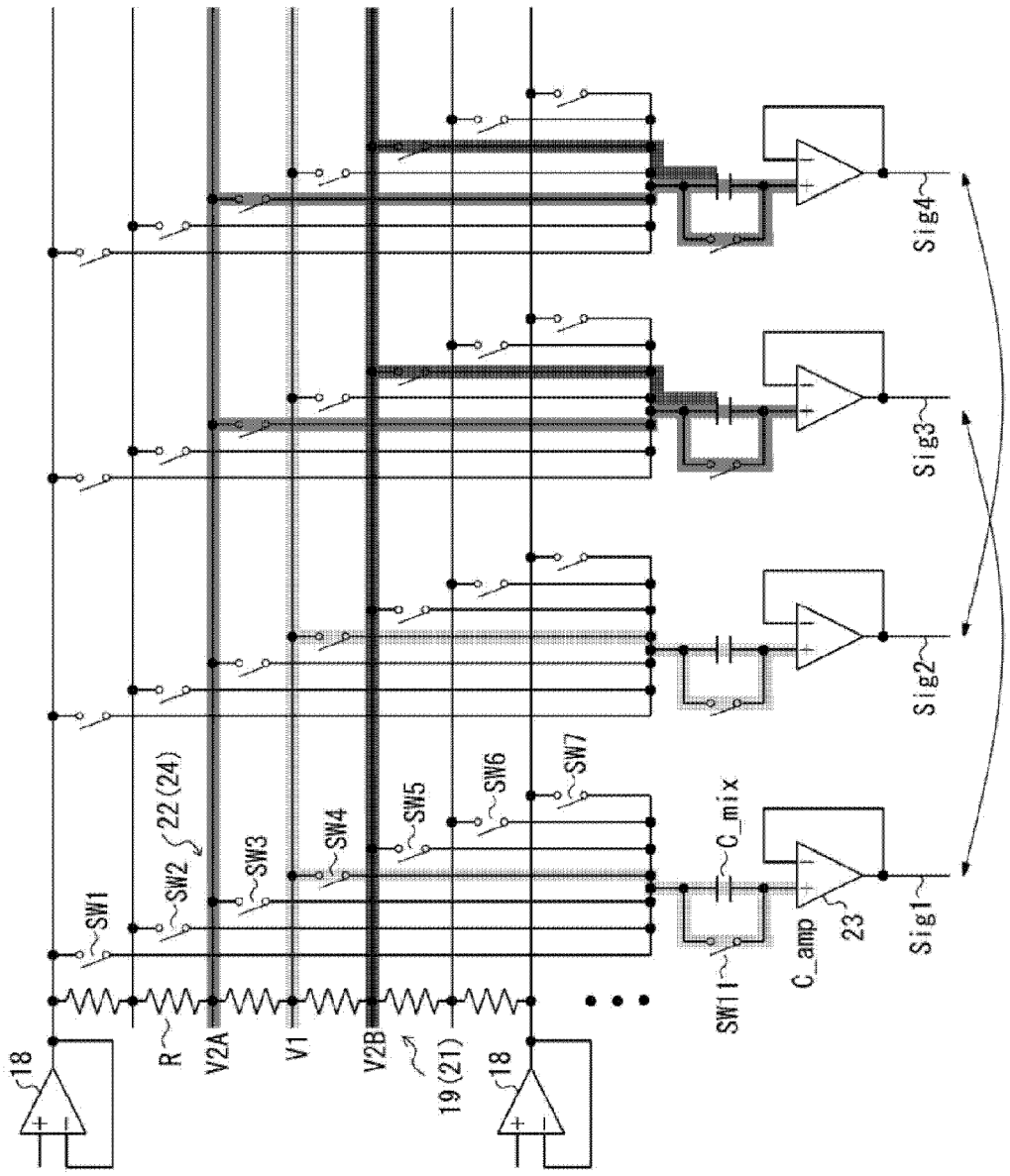
FIG. 18 is a diagram for explaining candidates of combination of signal lines in which the types of gradation voltages are switched.

In the first to third embodiments described above, gradation voltages supplied to the signal lines are made different between the signal lines of even-numbered columns and the signal lines of odd-numbered columns. However, it is not always necessary to switch the types of gradation voltages between two adjacent signal lines, and the types of gradation voltages may be switched between two non-adjacent signal lines. For example, FIG. 18 is a circuit diagram illustrating an example of a source driver 15. FIG. 18 illustrates four signal lines Sig1 to Sig4 arranged in the column direction. For example, the signal lines Sig1 and Sig3 pair up, and a gradation voltage V1 is supplied to one of the signal lines and gradation voltages V2A and V2B are supplied to the other by switching the voltages. Furthermore, the signal lines Sig2 and Sig4 pair up, and the gradation voltage V1 is supplied to one of the signal lines, and the gradation voltages V2A and V2B are supplied to the other by switching the voltages. Note that the pairing up of the signal lines Sig1 to Sig4 in FIG. 18 is also an example. The gradation voltage V1, for example, may be supplied to one signal line of any pair of the signal lines Sig1 to Sig4, and the gradation voltages V2A and V2B, for example, may be supplied to the other by switching the voltages. Alternatively, different gradation voltages may be supplied to any three or more signal lines.

Note that the present technology can have the following configurations.

(1) A drive circuit including:
a gradation voltage generation unit that generates a plurality of gradation voltages that can be supplied to a signal line; and
a voltage selector that selects, from among the plurality of gradation voltages, whether to supply a gradation voltage of the same voltage level as an assumed gradation voltage to a signal line or to supply a gradation voltage close to the assumed gradation voltage to a signal line.

(2) The drive circuit according to (1),
in which a plurality of the signal lines is arranged separately in a first direction, and
the voltage selector supplies the gradation voltage equal to the assumed gradation voltage to one of two signal lines arranged in a first direction, and supplies the gradation voltage different from the assumed gradation voltage to the other.

(3) The drive circuit according to (1) or (2), in which the voltage selector supplies, to a signal line to which a gradation voltage of the same voltage level as the assumed gradation voltage is supplied in one of two consecutive frame periods, a gradation voltage close to the assumed gradation voltage in the other frame period.

(4) The drive circuit according to any one of (1) to (3), in which the voltage selector selects, from among the plurality of gradation voltages, whether to supply a gradation voltage of the same voltage level as an assumed gradation voltage to a signal line or to supply two or more gradation voltages close to the assumed gradation voltage to a signal line by switching the voltages.

(5) The drive circuit according to (4), in which two or more gradation voltages close to the assumed gradation voltage include a gradation voltage having a voltage level higher than the assumed gradation voltage and a gradation voltage having a voltage level lower than the assumed gradation voltage.

(6) The drive circuit according to (4) or (5), in which the voltage selector selects whether to continuously supply the gradation voltage of the same level to a signal line in one horizontal line period or to supply the two or more gradation voltages to a signal line by switching the voltages in the one horizontal line period.

(7) The drive circuit according to (6), further including a voltage combiner that generates a voltage obtained by combining the two or more gradation voltages supplied by switching the voltages in one horizontal line period, and supplies the voltage to the corresponding signal line.

(8) The drive circuit according to (7),
in which the voltage combiner includes
an amplifier that is connected to the signal line and amplifies a voltage of the signal line, and
a first capacitor connected in parallel between an input node of the amplifier and an output node of the voltage selector, and a first switcher that switches whether or not both ends of the first capacitor are short-circuited, and
the voltage selector selects, in one horizontal line period, a first gradation voltage in a state where both ends of the first capacitor are short-circuited by the first switcher, and then selects a second gradation voltage in a state where short-circuiting of both ends of the first capacitor is released by the first switcher.

(9) The drive circuit according to (8), further including a second capacitor connected between an output node of the amplifier and a reference voltage node.

(10) The drive circuit according to any one of (4) to (9),
in which a plurality of the voltage selectors is provided for each signal line, and
a voltage switcher is further included that supplies a plurality of the gradation voltages selected by the plurality of voltage selectors to the signal line by switching the gradation voltages.

(11) The drive circuit according to (10), in which the voltage switcher supplies, to a corresponding signal line, a gradation voltage selected by the voltage selectors different from each other in one and the other of two consecutive frame periods.

(12) The drive circuit according to any one of (1) to (11),
in which the gradation voltage generation unit includes a ladder resistor including a plurality of output nodes that outputs the plurality of gradation voltages obtained by resistance-dividing two or more reference voltages, and
the voltage selector includes a plurality of second switchers that switches whether the plurality of output nodes of the ladder resistor and the signal line are connected or disconnected on the basis of a gradation signal.

(13) A display device including:
a pixel that includes a luminance modulation element that is modulated with luminance according to a voltage of a signal line;
a signal line that supplies a gradation voltage to the pixel; and
a drive circuit that generates the gradation voltage,
in which the drive circuit includes
a gradation voltage generation unit that generates a plurality of gradation voltages that can be supplied to the signal line, and
a voltage selector that selects, from among the plurality of gradation voltages, whether to supply a gradation voltage of the same voltage level as an assumed gradation voltage to the signal line or to supply a gradation voltage close to the assumed gradation voltage to the signal line.

(14) The display device according to (13),
in which a pixel array unit is further included that includes a plurality of the pixels arranged in a first direction and a second direction,
a plurality of the signal lines is arranged separately in the first direction, and
the voltage selector supplies the gradation voltages different from each other to two of the signal lines adjacent in the first direction.

(15) The display device according to (14), in which the voltage selector supplies the gradation voltage equal to the assumed gradation voltage to one of two signal lines adjacent in a first direction, and supplies the gradation voltage different from the assumed gradation voltage to the other.

(16) The display device according to (15), in which the voltage selector supplies, to the other of the two signal lines, two or more of the gradation voltages different from the assumed gradation voltage by switching the voltages in one horizontal line period.

(17) The display device according to (16), in which the pixel array unit includes a voltage combiner that generates a voltage obtained by combining the two or more gradation voltages supplied by switching the voltages in one horizontal line period, and supplies the voltage to the corresponding signal line.

(18) The display device according to (17), in which the voltage combiner is provided in the pixel.

(19) The display device according to (18), in which the voltage combiner includes a third switcher and a fourth switcher connected in series between the signal line and the luminance modulation element, a third capacitor connected between the signal line and a connection node of the third switcher and the fourth switcher, and a fourth capacitor of which one end is connected between the fourth switcher and the luminance modulation element and the other end is connected to a reference voltage node.

(20) The display device according to (18), in which the voltage combiner further includes a fifth switcher and a sixth switcher connected in series between the signal line and the luminance modulation element, a seventh switcher connected between the signal line and a connection node of the fifth switcher and the sixth switcher, a fifth capacitor connected between the connection node and a reference voltage node, and a sixth capacitor connected between the connection node and the reference voltage node.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST 1, 1a Display device
2 Light source
3 Optical system
4 Light modulation element
5 Screen
6a Video signal generation unit
6b Frame memory
10a Display system
11 IF unit
12 Signal processing unit
13 Gamma voltage generation circuit
14 Pixel array unit
15 Source driver
16 Gate driver
17 Timing controller
17a Timing controller
18 Amplifier
19 Ladder resistor
20 Pixel
21 Gradation voltage generation unit
22 Voltage selector
23 Source amplifier
24 Decoder
25 Transfer gate
26 Liquid crystal element

The invention claimed is:

1. A drive circuit, comprising:
a gradation voltage generation unit configured to generate a plurality of gradation voltages that is supplied to a first signal line; and
a voltage selector configured to supply:
a first gradation voltage of the plurality of gradation voltages, to the first signal line, in a first frame period of two consecutive frame periods,
wherein the first gradation voltage has a same voltage level as a specific gradation voltage;
and
a second gradation voltage of the plurality of gradation voltages, to the first signal line, in a second frame period of the two consecutive frame periods,
wherein the second gradation voltage is close to the specific gradation voltage.

2. The drive circuit according to claim 1, wherein
a plurality of signal lines is separate in a first direction, and
the voltage selector is further configured to supply:
the first gradation voltage equal to the specific gradation voltage to the first signal line of the plurality of signal lines in the first direction; and
a third gradation voltage different from the specific gradation voltage to a second signal line of the plurality of signal lines in the first direction.

3. The drive circuit according to claim 1, wherein the voltage selector is further configured to supply at least two gradation voltages of the plurality of gradation voltages close to the specific gradation voltage to the first signal line based on a switching operation of voltages.

4. The drive circuit according to claim 3, wherein the at least two gradation voltages close to the specific gradation voltage include the second gradation voltage having a voltage level higher than the specific gradation voltage and a third gradation voltage having the voltage level lower than the specific gradation voltage.

5. The drive circuit according to claim 3, wherein the voltage selector is further configured to select:
continuous supply of the first gradation voltage to the first signal line in one horizontal line period, or
supply of the at least two gradation voltages to the first signal line based on the switching operation of the voltages in the one horizontal line period.

6. The drive circuit according to claim 5, further comprising a voltage combiner configured to:
generate a third gradation voltage obtained based on combination of the at least two gradation voltages supplied based on the switching operation of the voltages in the one horizontal line period; and
supply the third gradation voltage to a corresponding signal line.

7. The drive circuit according to claim 6, wherein the voltage combiner includes:
an amplifier configured to amplify the third gradation voltage of the first signal line, wherein the amplifier is connected to the first signal line, and
a first capacitor connected in parallel between an input node of the amplifier and an output node of the voltage selector, and a first switcher configured to switch whether both ends of the first capacitor are short-circuited, and the voltage selector is further configured to:
- select, in the one horizontal line period, a fourth gradation voltage in a state where both ends of the first capacitor are short-circuited by the first switcher, and
- select a fifth gradation voltage in a state where both ends of the first capacitor, short-circuited by the first switcher, are released by the first switcher.

8. The drive circuit according to claim 7, further comprising a second capacitor connected between an output node of the amplifier and a reference voltage node.

9. The drive circuit according to claim 3, wherein
each signal line includes a plurality of voltage selectors, and
the drive circuit further comprises a voltage switcher configured to supply the plurality of gradation voltages selected by the plurality of voltage selectors to the first signal line based on the switching operation of the voltages.

10. The drive circuit according to claim 9, wherein
the voltage switcher is further configured to supply:
- a third gradation voltage selected by a first voltage selector of the plurality of voltage selectors in the first frame period of the two consecutive frame periods, to a corresponding signal line, and
- a fourth gradation voltage selected by a second voltage selector of the plurality of voltage selectors in the second frame period of the two consecutive frame periods, to the corresponding signal line, and
- the third gradation voltage is different from the fourth gradation voltage.

11. The drive circuit according to claim 1, wherein
the gradation voltage generation unit includes a ladder resistor,
the ladder resistor includes a plurality of output nodes configured to output the plurality of gradation voltages obtained by resistance-dividing two or more reference voltages, and
the voltage selector includes a plurality of switchers configured to switch whether the plurality of output nodes of the ladder resistor and the first signal line are connected or disconnected based on a gradation signal.

12. A display device, comprising:
a pixel that includes a luminance modulation element, wherein the luminance modulation element is modulated with luminance based on a gradation voltage of a signal line;
the signal line configured to supply the gradation voltage to the pixel; and
a drive circuit configured to generate the gradation voltage, wherein the drive circuit includes:
- a gradation voltage generation unit configured to generate a plurality of gradation voltages that is supplied to the signal line, wherein the plurality of gradation voltages includes the gradation voltage; and
- a voltage selector configured to supply:
  - a first gradation voltage of the plurality of gradation voltages, to the signal line, in a first frame period of two consecutive frame periods,
    wherein the first gradation voltage has a same voltage level as a specific gradation voltage; and
  - a second gradation voltage of the plurality of gradation voltages, to the signal line, in a second frame period of the two consecutive frame periods,
    wherein the second gradation voltage is close to the specific gradation voltage.

13. The display device according to claim 12, further comprising
a pixel array unit including a plurality of pixels in a first direction and a second direction, wherein
a plurality of signal lines is separate in the first direction, and
the voltage selector is further configured to supply:
- a third gradation voltage of the plurality of gradation voltages to a first signal line of two signal lines adjacent in the first direction, and
- a fourth gradation voltage of the plurality of gradation voltages to a second signal line of the two of the signal lines adjacent in the first direction.

14. The display device according to claim 13, wherein the voltage selector is further configured to supply:
the first gradation voltage equal to the specific gradation voltage to the first signal line, and
the second gradation voltage different from the specific gradation voltage to the second signal line.

15. The display device according to claim 14, wherein the voltage selector is further configured to supply, to the second signal line, at least two gradation voltages different from the specific gradation voltage based on switching operation of voltages in one horizontal line period.

16. The display device according to claim 15, wherein the pixel array unit further includes a voltage combiner configured to:
generate a fifth gradation voltage obtained based on combination of the at least two gradation voltages supplied based on the switching operation of the voltages in the one horizontal line period; and
supply the fifth gradation voltage to a corresponding signal line.

17. The display device according to claim 16, wherein the voltage combiner is in the pixel.

18. The display device according to claim 17, wherein the voltage combiner includes:
a third switcher and a fourth switcher connected in series between the signal line and the luminance modulation element,
a third capacitor connected between the signal line and a connection node of the third switcher and the fourth switcher, and
a fourth capacitor having a first end connected between the fourth switcher and the luminance modulation element and a second end connected to a reference voltage node.

19. The display device according to claim 17, wherein the voltage combiner includes:
a fifth switcher and a sixth switcher connected in series between the signal line and the luminance modulation element,
a seventh switcher connected between the signal line and a connection node of the fifth switcher and the sixth switcher,
a fifth capacitor connected between the connection node and a reference voltage node, and
a sixth capacitor connected between the connection node and the reference voltage node.

* * * * *